(12) United States Patent
Nagoya

(10) Patent No.: US 7,865,474 B2
(45) Date of Patent: Jan. 4, 2011

(54) DATA PROCESSING SYSTEM

(75) Inventor: Mitsugu Nagoya, Tokyo (JP)

(73) Assignee: Duaxes Corporation, Tokyo (JP)

( * ) Notice: Subject to any disclaimer, the term of this patent is extended or adjusted under 35 U.S.C. 154(b) by 52 days.

(21) Appl. No.: 11/915,135

(22) PCT Filed: Jul. 27, 2006

(86) PCT No.: PCT/JP2005/013772

§ 371 (c)(1),
(2), (4) Date: Jan. 5, 2009

(87) PCT Pub. No.: WO2006/123443

PCT Pub. Date: Nov. 23, 2006

(65) Prior Publication Data

US 2009/0216802 A1     Aug. 27, 2009

(51) Int. Cl.
G06F 7/00 (2006.01)
(52) U.S. Cl. ...................... 707/648; 707/825
(58) Field of Classification Search ............ 707/999.01, 707/999.101, 999.102, 648, 825
See application file for complete search history.

(56) References Cited

U.S. PATENT DOCUMENTS

2004/0095928 A1* 5/2004 O'Neill et al. ............... 370/389

FOREIGN PATENT DOCUMENTS

| JP | 63-43446 | 2/1988 |
|---|---|---|
| JP | 3-131141 | 6/1991 |
| JP | 4-180425 | 6/1992 |
| JP | 6-75840 | 3/1994 |
| JP | 11-161683 A | 6/1999 |
| JP | 11-232279 | 8/1999 |
| JP | 2001-51890 | 2/2001 |
| JP | 2001168911 | 6/2001 |
| JP | 2001-222457 | 8/2001 |
| JP | 2001-282797 | 10/2001 |
| JP | 2003169044 | 6/2003 |
| JP | 2003-258997 | 9/2003 |
| JP | 2004140618 | 5/2004 |

(Continued)

OTHER PUBLICATIONS

International Preliminary Report on Patentability (Chapter I of the Patent Cooperation Treaty) for International Application No. PCT/JP2005/013772, mailed on Nov. 23, 2007 (10 pages).

(Continued)

*Primary Examiner*—Hosain T Alam
*Assistant Examiner*—Amy Ng
(74) *Attorney, Agent, or Firm*—Ladas & Parry, LLP

(57) ABSTRACT

A data processing system includes a data processing unit which processes data acquired and a plurality of data retaining units which store databases used to process the data. Each of the plurality of data retaining units stores a primary database in common and stores the respective shares of a secondary database. The primary database stores a list of IDs for identifying data to be processed by any one of the plurality of data processing units. Each of the data processing units is notified of a range of IDs that the data processing unit handles, among the list of IDs stored in the primary database, and, when acquiring a packet containing an ID that lies within the range of IDs, the data processing unit processes the packet.

17 Claims, 23 Drawing Sheets

FOREIGN PATENT DOCUMENTS

| | | |
|---|---|---|
| JP | 2004164435 | 6/2004 |
| JP | 2004172917 | 6/2004 |
| JP | 2004187201 | 7/2004 |
| JP | 2005018942 | 1/2005 |
| JP | 2005-84841 | 3/2005 |
| WO | 02/082750 A1 | 10/2002 |

OTHER PUBLICATIONS

Japanese Office Action for Japanese Application No. 2006-552413, mailed on Jun. 19, 2007 (7 pages).
International Search Report for International Application No. PCT/JP2005/013772, mailed on Oct. 4, 2005 (4 pages).
Patent Abstracts of Japan for Japanese Publication No. 2001-282797, Publication date Oct. 12, 2001 (1 page).
Patent Abstracts of Japan for Japanese Publication No. 2001-051890, Publication date Feb. 23, 2001 (1 page).
Patent Abstracts of Japan for Japanese Publication No. 06-075840, Publication date Mar. 18, 1994 (1 page).
Patent Abstracts for Japanese Publication No. 2003-258997, Publication date Sep. 12, 2003 (1 page).
Patent Abstracts of Japan for Japanese Publication No. 03-131141, Publication date Jun. 4, 1991 (1 page).
Patent Abstracts of Japan for Japanese Publication No. 63-043446, Publication date Feb. 24, 1988 (1 page).
Patent Abstracts of Japan for Japanese Publication No. 2001-222457, Publication No. Aug. 17, 2001 (1 page).
"Spamghetti no Unyo Manual", (Online), [2005 Nen 9 Gatsu 15 Nichi Kensaku], Internet <URL:http//66.102.7.104/search?q=cache:cqxjXwbSYtwJwww.spamghetti.com/jp/v3/admin/a_c04.html>.
Japanese Office Action for Japanese Application No. 2006-552413, mailed on Jan. 22, 2008 (5 pages).
Kaoru ODA, "Security Measure to Prevent Abuse of Packet Capture", PC Japan, Softbank Publishing Corp., 2005, May, vol. 10, No. 5, pp. 77-83 (22 pages).
Chinese Office Action for Chinese Application No. 200580050928.X, mailed on Feb. 6, 2009 (11 pages).
Japanese Office Action for Japanese Application No. 2006-552407, mailed on Jan. 22, 2008 (5 pages).
International Preliminary Report on Patentability for International Application No. PCT/JP2005/009246, mailed on Jul. 19, 2005 (9 pages).
International Search Report for International Application No. PCT/JP2005/009246, mailed on Jul. 19, 2005 (6 pages).
Patent Abstracts of Japan for Japanese Publication No. 11-161683, Publication date Jun. 18, 1999 (1 page).
Patent Abstracts of Japan for Japanese Publication No. 2005-084841, Publication date Mar. 31, 2005 (1 page).
Japanese Office Action for Japanese Application No. 2006-552407, mailed on Jun. 5, 2007 (5 pages).
Korean Office Action for Korean Application No. 10-2007-7008755, mailed on Jul. 29, 2008 (8 pages).
Patent Abstracts of Japan for Japanese Publication No. 11-232279, Publication date Aug. 27, 1999 (1 page).
Japanese Office Action for Japanese Application No. 2007-106290, mailed on Jun. 17, 2008 (7 pages).
International Search Report for PCT/JP2005/012605 Mailed Oct. 25, 2005 w/ English Translation (4 Pages).
International Preliminary Report on Patentability (Chapter 1 of the Patent Cooperation Treaty) for International Application No. PCT/JP2005/012605, Dated Aug. 21, 2007 w/ English Translation Thereof (8 Pages).
Japanese Office Action for Japanese Application No. 2007-503569, Mailed on Mar. 20, 2007, w/ English Translation Thereof (4 Pages).
Japanese Office Action for Japanese Application No. 2007-503569, Mailed on Oct. 16, 2007 (4 Pages).
Office Action in Japanese Patent Application No. 2007-503569, w/ English Translation, Mailed Jan. 29, 2008 (6 Pages).
Patent Abstracts of Japan, Publication No. 2005-018942, Publication Date Jan. 20, 2005 (1 Page).
Patent Abstracts of Japan, Publicaiton No. 2004-164435, Publication Date Jun. 10, 2004 (1 Page).
Patent Abstracts of Japan, Publication No. 2003-169044, Publication Date Jun. 13, 2003 (1 Page).

* cited by examiner

FIG.10

| | |
|---|---|
| MATCHED | PERMIT |
| NOT MATCHED | DISCARD |

| | |
|---|---|
| 0 | PERMIT |
| 3 | DISCARD |
| 4 | REPLACEMENT |
| 7 | ROUTING |
| 8 | SWITCHING |
| ⋮ | ⋮ |

| CATEGORY NO. | URL | TITLE |
|---|---|---|
| 0 | http://www.xxx.xxx/x5.html | X X X |
| 0 | http://www.xx.xx/ | X X X |
| ⋮ | ⋮ | ⋮ |

| CATEGORY NO. | URL | TITLE |
|---|---|---|
| 1 | http://www.xxx.com/xxx.html | RANKING |
| 1 | http://www.x.co.jp/ | QUESTIONNAIRE |
| ⋮ | ⋮ | ⋮ |

| CATEGORY NO. | URL | TITLE |
|---|---|---|
| 3 | http://www.xxx.com/x/1.html | CRIME |
| 4 | http://www.xxx.com/x/2.html | CRIME |
| ⋮ | ⋮ | ⋮ |

| CATEGORY NO. | URL | TITLE |
|---|---|---|
| 1 | http://www.xxx/x.html | TRAVEL |
| 1 | http://www.xxx/a.html | TICKETS |
| ⋮ | ⋮ | ⋮ |
| 1 | http://www.xxx.xxx/1.html | HOT SPRING |
| 2 | http://www.xxx.com/ | MOVIES |
| 2 | http://www.x.co.jp/r.html | RECOMMENDED |
| ⋮ | ⋮ | ⋮ |
| 2 | http://www.x.co.jp/1/x/ | REVIEW |
| 3 | http://www.xxx.com/x/1.html | CRIME |
| 3 | http://www.xxx/x/1.html | VIOLENCE |
| ⋮ | ⋮ | ⋮ |

165 / 166 / 167

164

FIG.16A
VIRUS/PHISHING SITE LIST 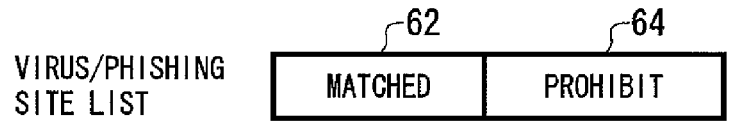
FIG.16B
WHITELIST 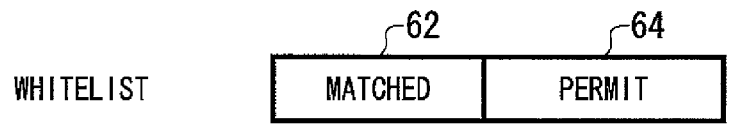
FIG.16C
BLACKLIST 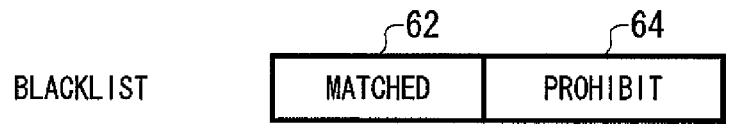
FIG.16D
COMMON CATEGORY LIST
| USER ID | CATEGORY | | | | | | |
|---|---|---|---|---|---|---|---|
| | 1 | 2 | 3 | 4 | 5 | ⋯⋯ | 57 |
| 000001 | ○ | × | × | ○ | ○ | ⋯⋯ | × |
| 000002 | ○ | ○ | × | × | ○ | ⋯⋯ | ○ |
| 000003 | ○ | ○ | × | ○ | × | ⋯⋯ | ○ |
| ⋮ | ⋮ | ⋮ | ⋮ | ⋮ | ⋮ | ⋮ | ⋮ |
60

FIG.20

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | STANDBY | - |

FIG.21

| APPARATUS ID | OPERATING STATE | USER ID |
|---|---|---|
| 1 | OPERATING | 000001~100000 |
| 2 | FAILURE | - |
| 3 | OPERATING | 200001~300000 |
| 4 | OPERATING | 300001~400000 |
| 5 | OPERATING | 400001~465183 |
| 6 | OPERATING | 100001~200000 |

FIG.22A

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | STANDBY | - |

FIG.22B

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | DATA UPDATING | 000001~100000 |

FIG.22C

| APPARATUS ID | OPERATING STATE | USER ID |
|---|---|---|
| 1 | STANDBY | - |
| 2 | OPERATING | 100001~200000 |
| 3 | OPERATING | 200001~300000 |
| 4 | OPERATING | 300001~400000 |
| 5 | OPERATING | 400001~465183 |
| 6 | OPERATING | 000001~100000 |

DATA PROCESSING SYSTEM

TECHNICAL FIELD

The present invention relates to a data processing technique, particularly to a technique for operating multiple databases.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control.

The Internet has enabled easy access to a vast amount of information. On the other hand, harmful information is proliferating thereon and regulation on its originator does not keep up with the proliferation. To provide an environment where everyone can use the Internet safely and effectively, there is required an appropriate technique for controlling access to harmful contents.

For example, there has been proposed an access control technique in which are prepared databases containing lists of sites to which access is permitted or prohibited, forbidden keywords or useful keywords, so as to control access to external information via the Internet with reference to such databases (see Patent Document 1, for example).

[Patent Document 1] Japanese Patent Application Laid-open No. 2001-282797.

DISCLOSURE OF INVENTION

Problem to be Solved by the Invention

If the number of users increases in a system where access control is performed as described in Patent Document 1, the amount of the databases may increase enormously and may possibly exceed the capacity that can be stored. In such case, replacing the entire system is inefficient as it requires unnecessary costs. It is also inefficient to prepare another system to be operated in the event that the operation of the main system has to be halted, such as when updating databases; the larger the system, the less efficient it will be.

The present invention has been made in view of such a situation, and a general purpose thereof is to provide a technique for operating multiple databases appropriately.

Means for Solving the Problem

One aspect of the present invention relates to a data processing apparatus. The data processing system comprises: a data processing unit which processes data acquired; and a plurality of data retaining units which store databases used to process the data, wherein: each of the plurality of data retaining units stores a primary database in common and stores the respective shares of a secondary database; and the data processing system further comprises at least one more data retaining unit which can store the primary database and the respective shares of the secondary database.

In such way, when databases are shared and stored by multiple data retaining units, which are operated cooperatively, the size of each of the data retaining units can be reduced. This can consequently reduce costs and man-hours required for the expansion of the system scale due to increase of data amount or the like. Also, there is no need to duplex the entirety of a large data processing apparatus to prepare a standby unit for database updating or the like. Instead, since only at least one of the comparatively small data retaining units need be provided extra as a standby unit, the system configuration can be simplified, thereby reducing initial investment or operational costs.

The primary database may contain data for determining which share of the secondary database is to be used to process the data. For example, the primary database may contain data for user authentication, while the secondary database may contain information on data processing for each user, etc.

The data processing system may further comprise an operation management unit, which manages the operating state of the plurality of data retaining units. The operation management unit may operate as many as the number of data retaining units required to share and store the secondary database, and may place the other data retaining unit on standby; when a database retained in the data retaining units is updated, the operation management unit may store, in a data retaining unit on standby, updated data of the database retained in any one of the data retaining units in operation, and may subsequently stop the operation of the data retaining unit storing the database before update and place the data retaining unit storing the updated database in operation. Thus, databases can be updated without halting the operation.

When detecting a data retaining unit in operation being inoperable, the operation management unit may store the database retained by the data retaining unit in a data retaining unit on standby, and may place the data retaining unit on standby in operation. Thus, even if one of the data retaining units stops because of failure or the like, the main operation will be continued properly.

The data retaining unit on standby may store the primary database in advance. If the data retaining unit stores, in advance, the primary database, which is used mutually and contains data for determining which share of the secondary database is to be used to process the data, the data retaining unit on standby can be placed in operation promptly even though one of the data retaining units in operation becomes inoperable.

A plurality of the data processing units may be provided so as to correspond to the plurality of data retaining units respectively. Also, the data processing system may further comprise a data supply unit, which provides acquired data to the plurality of data processing units in parallel. This enables appropriate data processing using the data processing units even in the case where a data retaining unit is further added, or the case where the content of a database retained by the respective data retaining units is changed because of database updating or the like.

The data supply unit may provide acquired data as it is to the plurality of data processing units in parallel without processing the data. Consequently, the data supply unit need not process data, thereby improving the data processing speed.

Upon acquisition of data from the data supply unit, each of the plurality of data processing units may refer to a database retained in the corresponding data retaining unit so as to determine whether or not to process the data. Accordingly, data can be appropriately processed by the proper data processing unit.

The data processing units may be communication control apparatuses which acquire packets to control communications, and, upon acquisition of a packet from the data supply unit, each of the data processing units may acquire the packet without determining whether the packet is directed to the data processing unit itself, and may refer to a database retained in the corresponding data retaining unit so as to determine whether or not to process the packet. Consequently, the data processing units need not check MAC addresses or IP addresses, thereby improving the packet processing speed.

Each of the communication control apparatuses may use information stored in the data portion of the packet instead of information stored in the header portion thereof to determine whether or not to process the packet. Also, each of the communication control apparatuses may refer to the primary database retained in the corresponding data retaining unit so as to determine whether or not to process the packet.

A data processing unit that has determined not to process the packet may discard the packet, while a data processing unit that has determined to process the packet processes the packet.

The primary database may store a list of IDs for identifying data to be processed by any one of the plurality of data processing units. Accordingly, each of the data processing units may be notified of a range of IDs that the data processing unit should handle, among the list of IDs stored in the primary database, and, when acquiring a packet containing an ID that lies within the range of IDs, the data processing unit may process the packet. Also, when acquiring a packet that does not contain any of the IDs included in the list of IDs stored in the primary database, at least one of the plurality of data processing units may make the packet pass through without processing it.

The data supply unit may provide to the plurality of communication control apparatuses in parallel an acquired packet as a unicast packet without converting the packet to a broadcast packet. Consequently, the data supply unit need not, for example, process the header of the packet to convert the packet to a broadcast, thereby improving the packet processing speed.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for operating multiple databases appropriately.

BRIEF DESCRIPTION OF THE DRAWINGS

FIG. 10 is a diagram that shows an example of internal data of a second database.

FIG. 11 is a diagram that shows another example of internal data of the second database.

FIG. 14A is a diagram that shows an example of internal data of a virus/phishing site list; FIG. 14B is a diagram that shows an example of internal data of a whitelist; and FIG. 14C is a diagram that shows an example of internal data of a blacklist.

FIG. 15 is a diagram that shows an example of internal data of a common category list.

FIGS. 16A, 16B, 16C and 16D are diagrams that show examples of internal data of the second database.

FIG. 20 is a diagram that shows an example of internal data of a management table provided in an operation monitoring server.

FIG. 21 is a diagram for describing an operational procedure performed in the event that a communication control apparatus fails.

FIGS. 22A, 22B and 22C are diagrams for describing a procedure for updating databases in the communication control apparatuses.

Figure 1:
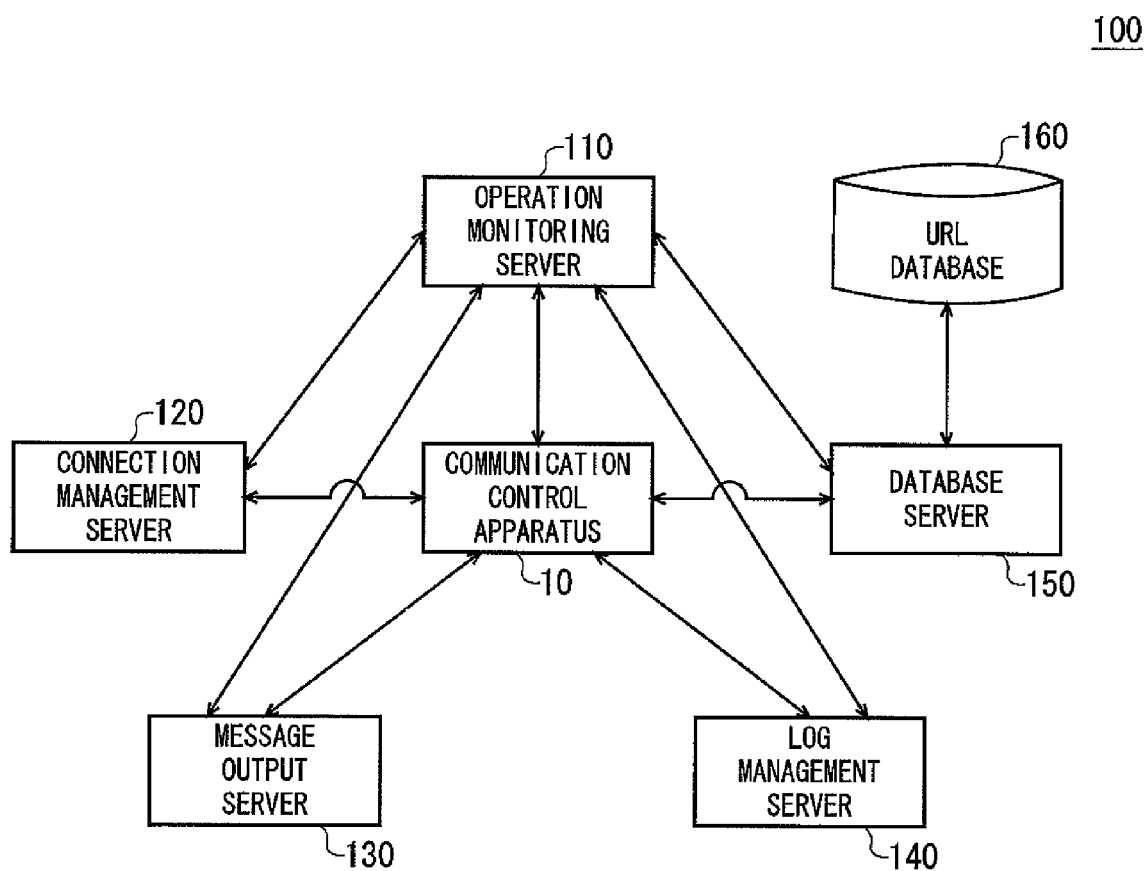
FIG. 1 is a diagram that shows a configuration of a communication control system according to a base technology.

EXPLANATION OF REFERENCE NUMERALS 10 communication control apparatus
12 communication control unit
14 switch control unit
20 packet processing circuit
30 search circuit
32 position detection circuit
33 comparison circuit
34 index circuit
35 comparison circuit
36 binary search circuit
40 process execution circuit
50 first database
57 user database
60 second database
100 communication control system
110 operation monitoring server
111 management table
120 connection management server
130 message output server
140 log management server
150 database server 160 URL database
161 virus/phishing site list
162 whitelist
163 blacklist
164 common category list
200 communication path control apparatus
210 switch
220 optical splitter
230 switch

BEST MODE FOR CARRYING OUT THE
INVENTION (Base Technology)

First, as a base technology, a communication control apparatus will be described as an illustrative data processing apparatus, and the configuration of its peripheral apparatuses and the outline of the operation will be also explained. Thereafter, there will be described a URL filtering technique using the communication control apparatus before a technique for operating multiple communication control apparatuses will be described as an embodiment.

FIG. 1 shows a configuration of a communication control system according to the base technology. A communication control system 100 comprises a communication control apparatus 10 and various peripheral apparatuses provided to support the operation of the communication control apparatus 10. The communication control apparatus 10 of the base technology performs a URL filtering function provided by an Internet service provider or the like. The communication control apparatus 10 provided on a network path acquires a request for access to a content, analyzes the content, and determines whether or not the access to the content should be permitted. If the access to the content is permitted, the communication control apparatus 10 will transmit the access request to a server that retains the content. If the access to the content is prohibited, the communication control apparatus 10 will discard the access request and return a warning message or the like to the source of the request. The communication control apparatus 10 of the base technology receives an access request, such as an HTTP (HyperText Transfer Protocol) "GET" request message. The apparatus then searches a list of reference data for determining access permission to check if the URL of the content to be accessed appears in the list, so as to determine whether or not the access to the content should be permitted.

The peripheral apparatuses include an operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user of the communication control apparatus 10, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of an access request, according to whether the communication control apparatus 10 has permitted the access. The log management server 140 manages the operating history of the communication control apparatus 10.

The database server 150 acquires the latest database from a URL database 160 and provides the database to the communication control apparatus 10. To update the database without halting the operation of the communication control apparatus 10, the apparatus may possess a backup database. The operation monitoring server 110 monitors the operating state of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. The communication control apparatus 10 is configured with a dedicated hardware circuit, as will be described later. By inputting to or outputting from the communication control apparatus 10 the data for monitoring by means of a boundary-scan circuit, based on the technique described in Japanese Patent No. 3041340 filed by the present applicant or other techniques, the operation monitoring server 110 can monitor the operating state even while the communication control apparatus 10 is in operation.

In the communication control system 100 of the base technology, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the base technology provides such communication control system having high flexibility.

Figure 2:
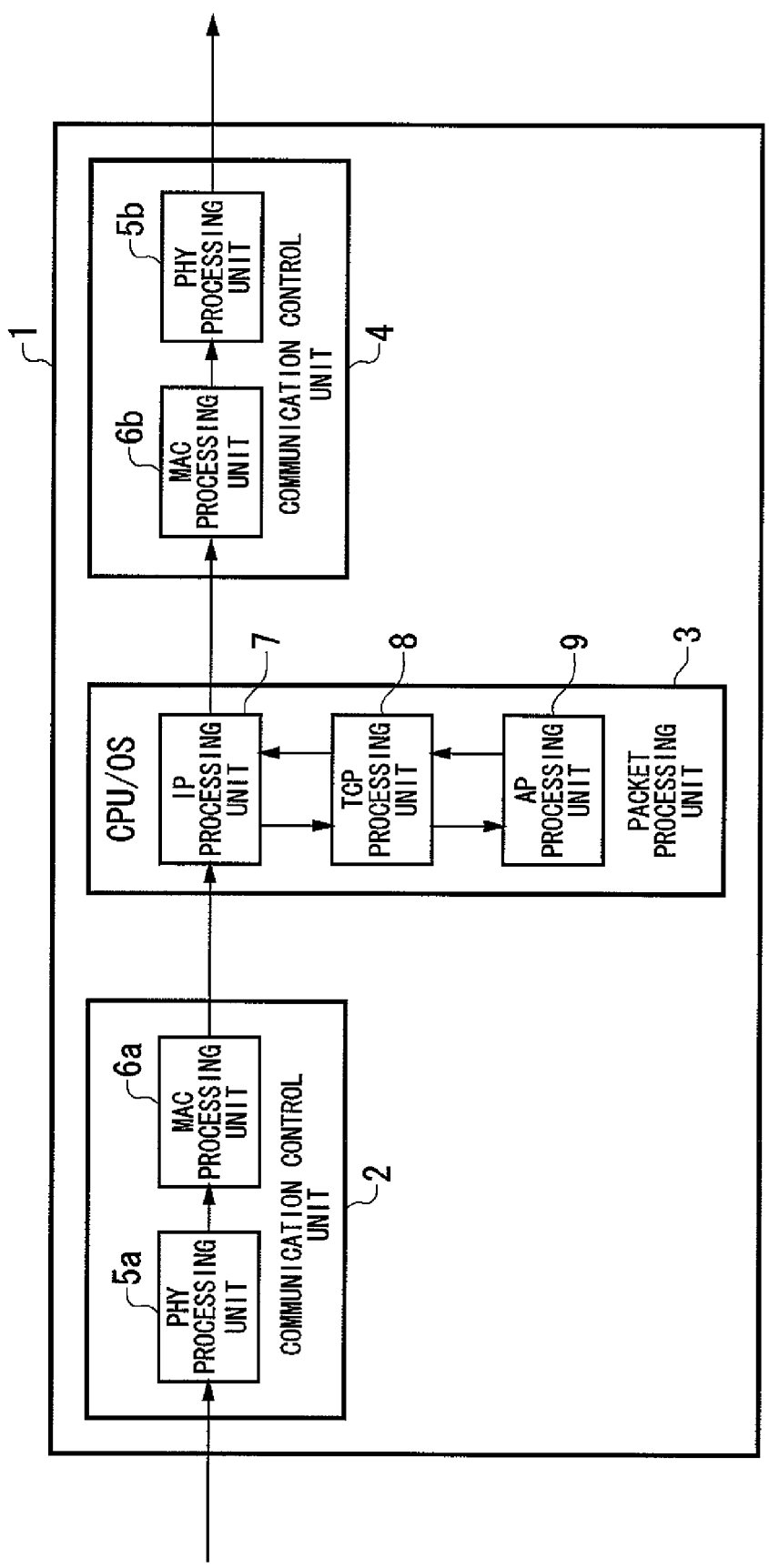
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
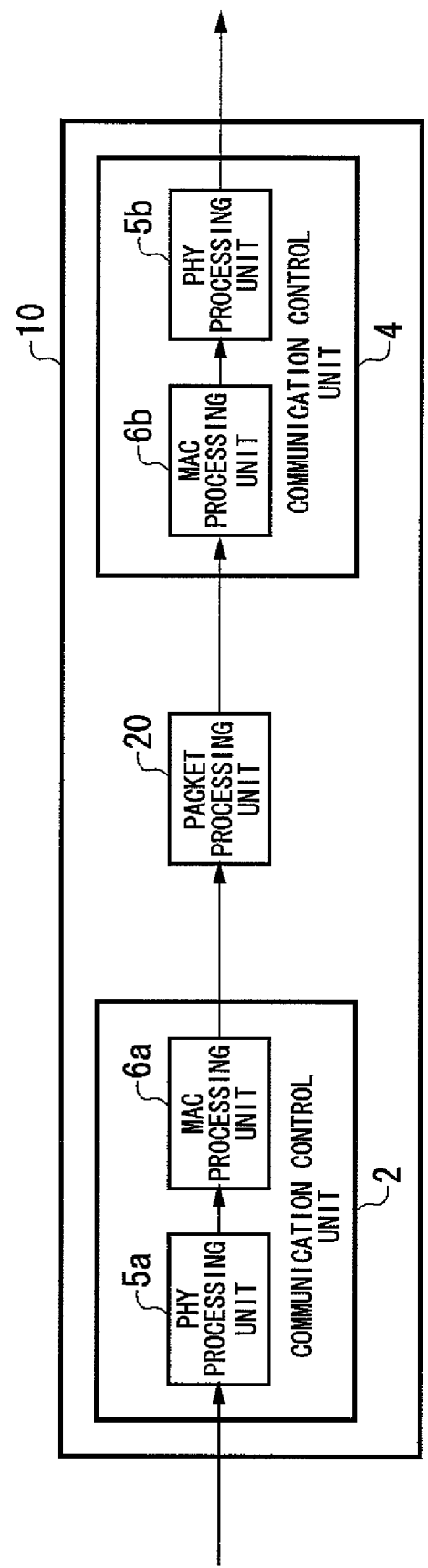
FIG. 3 is a diagram that shows a configuration of a communication control apparatus according to the base technology.

FIG. 3 shows a configuration of a communication control apparatus in the base technology. The communication control apparatus 10 comprises a packet processing circuit 20 configured with dedicated hardware employing a wired logic circuit, instead of the packet processing unit 3 implemented by software including a CPU and an OS in the conventional communication control apparatus 1 shown in FIG. 2. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which, in packet filtering or the like, a search is conducted to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck which limits the processing speed.

In the base technology, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size. The dedicated hardware circuit may be configured using FPGA (Field Programmable Gate Array), etc.

Since the communication control apparatus 10 of the base technology is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the base technology, all packet data need not be received before starting the processing. Upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 4:
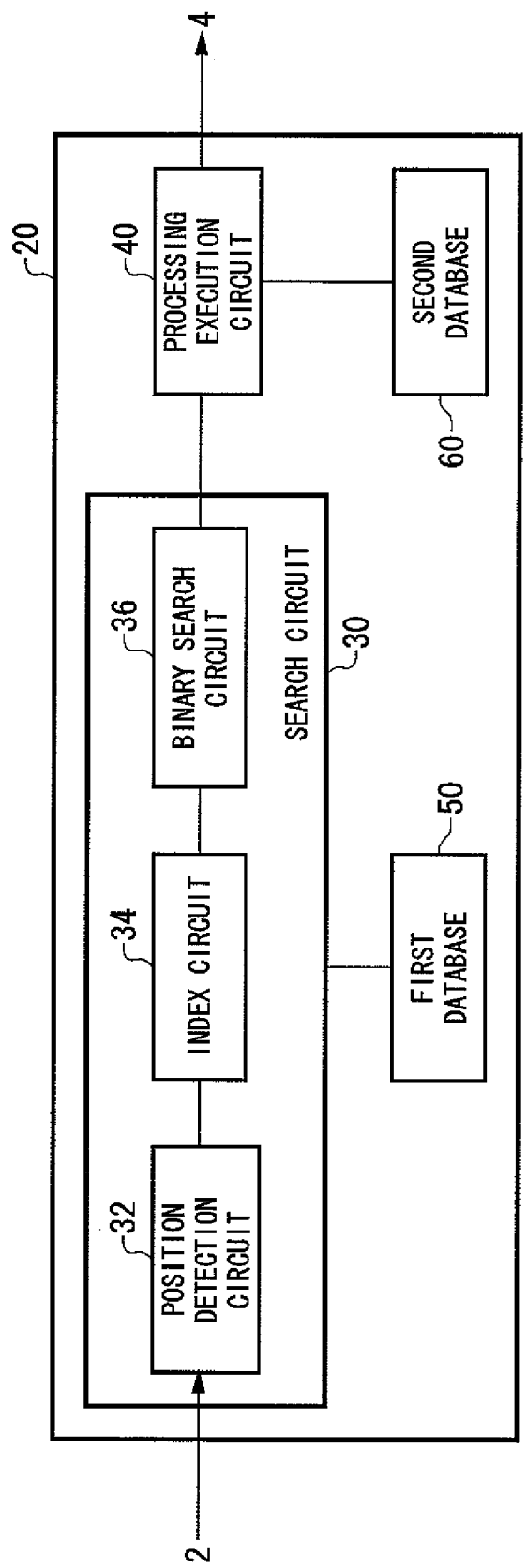
FIG. 4 is a diagram that shows an internal configuration of a packet processing circuit.

FIG. 4 shows an internal configuration of the packet processing circuit. The packet processing circuit 20 comprises: a first database 50 for storing reference data to be referred to when determining processing to be performed on communication data; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit for determining which range the comparison target data belongs to, among three or more ranges into which the reference data stored in the first database 50 is divided; and a binary search circuit 36 for searching the determined range for the reference data that matches the comparison target data. The reference data may be searched for the comparison target data using any search technique, and a binary search method is used in the base technology.

Figure 5:
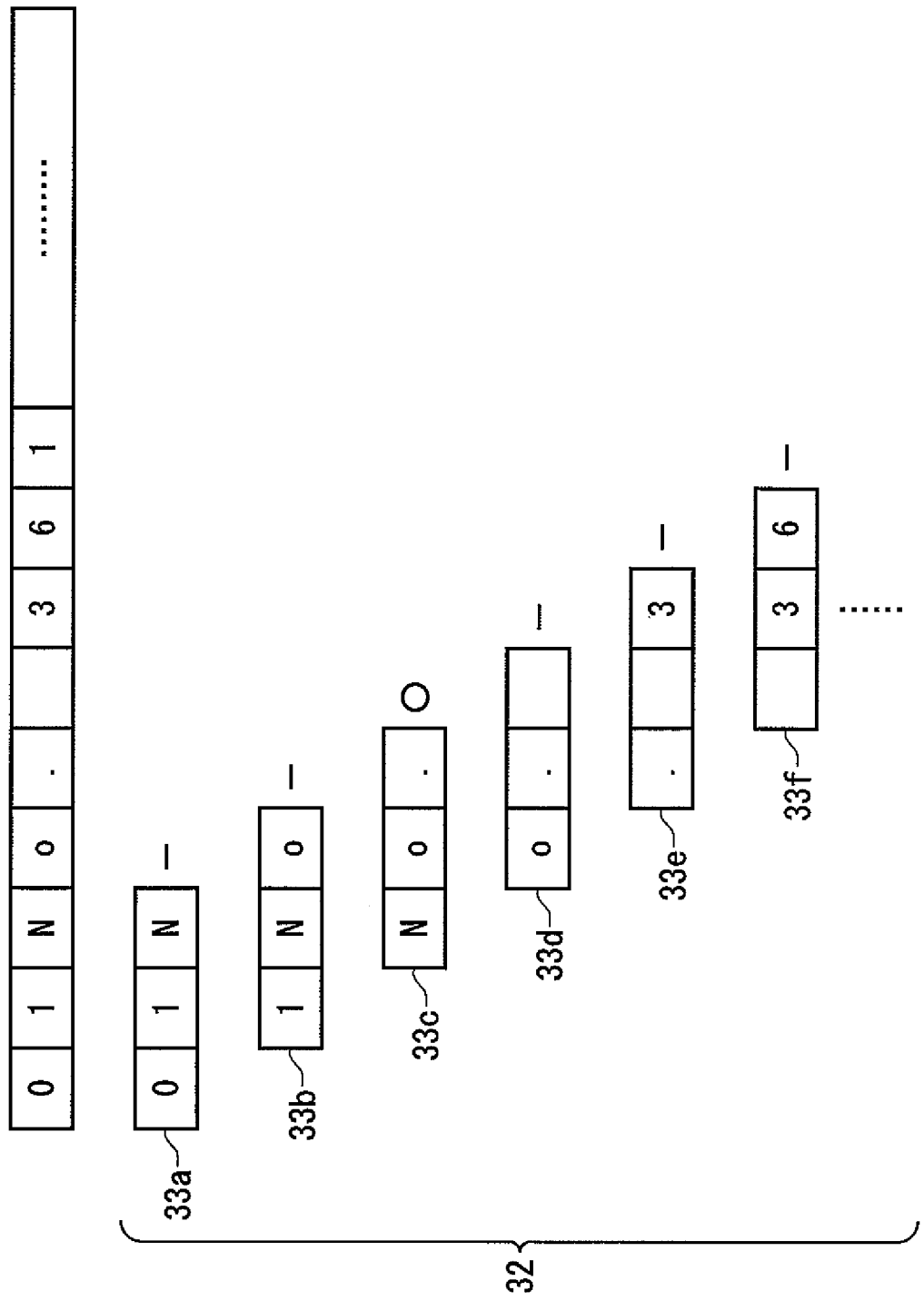
FIG. 5 is a diagram that shows an internal configuration of a position detection circuit.

FIG. 5 shows an internal configuration of the position detection circuit. The position detection circuit 32 includes multiple comparison circuits 33a-33f which compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the communication data with the position identification data to be detected in parallel.

The base technology will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 . . . " is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o. " to the comparison circuit 33d, ". 3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is determined that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the base technology, in contrast, providing the multiple comparison circuits 33a-33f in parallel enables simultaneous parallel comparison processing, which could not have been performed by a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
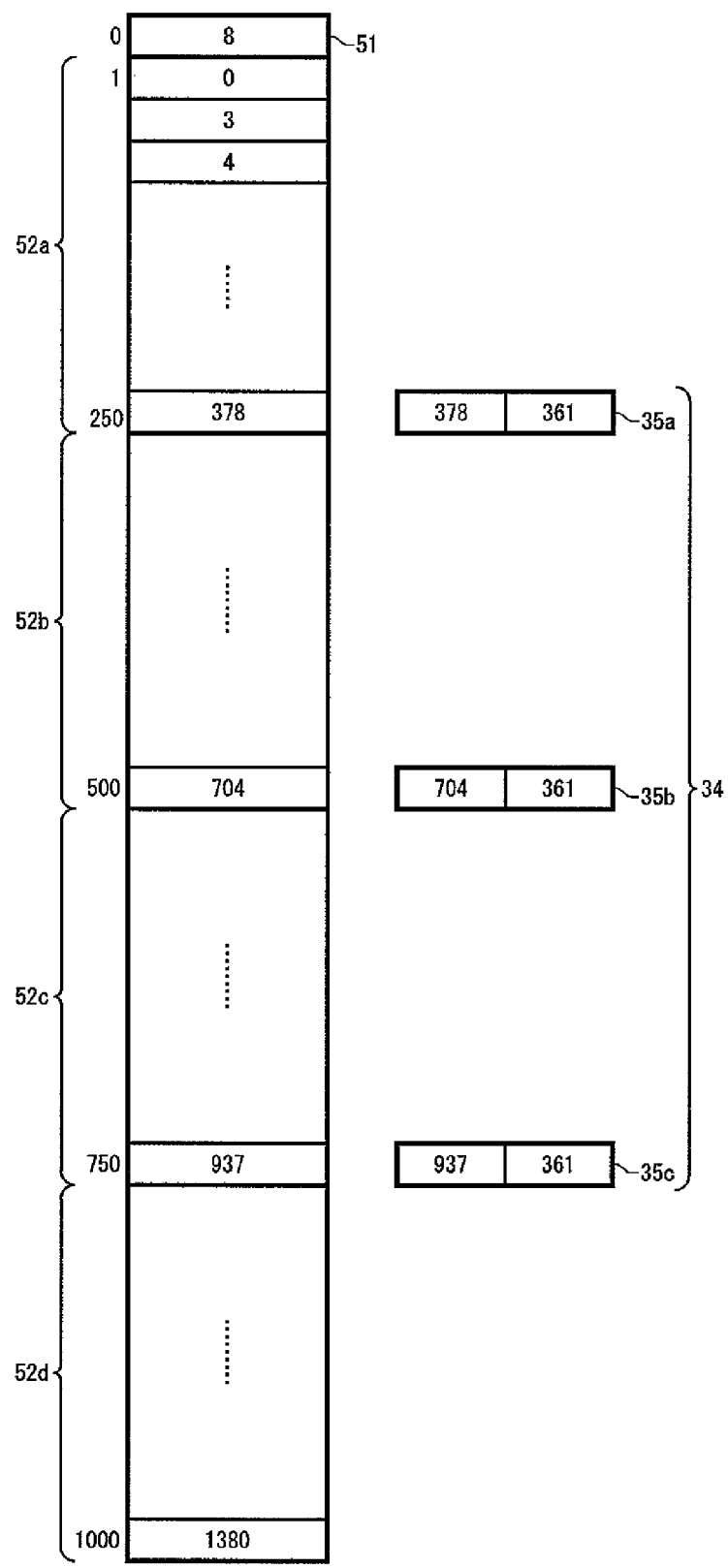
FIG. 6 is a diagram that shows an example of internal data of a first database.

FIG. 6 shows an example of internal data of the first database. The first database 50 stores reference data to be referred to when determining the processing on packets, such as filtering, routing, switching, and replacement. The pieces of reference data are sorted according to some sort conditions. In the example of FIG. 6, 1000 pieces of reference data are stored.

The top record of the first database 50 contains an offset 51 which indicates the position of comparison target data in communication data. For example, in a TCP packet, the data configuration within the packet is determined in units of bits. Therefore, if the position of flag information or the like for determining the processing on the packet is given in the form of the offset 51, the processing can be determined by comparing only necessary bits, thus improving the processing efficiency. Also, even when the configuration of packet data is changed, it can be settled by modifying the offset 51 accordingly. The first database 50 may store the data length of comparison target data. In this case, since the comparison can be performed by operating only a required number of comparators, the search efficiency can be improved.

The index circuit 34 determines which range the comparison target data belongs to, among three or more ranges, such as 52a-52d, into which reference data stored in the first database 50 is divided. In the example of FIG. 6, the 1000 pieces of reference data are divided into four ranges 52a-52d, i.e., 250 pieces each. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be input automatically as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the base technology, in contrast, providing the multiple comparison circuits 35a-35c in parallel enables simultaneous parallel comparison processing, with a significant improvement in the search speed.

After the index circuit 34 determines the relevant range, the binary search circuit 36 performs a search using a binary search method. The binary search circuit 36 divides the range determined by the index circuit 34 further into two and subsequently compares the piece of reference data lying at the border with the comparison target data, thereby determining which range the comparison target data belongs to. The binary search circuit 36 includes multiple comparison circuits for comparing, bit by bit, reference data with comparison target data. For example, in the base technology are provided 1024 comparison circuits to perform bit matching on 1024 bits simultaneously. When the range to which the comparison target data belongs is determined between the two split ranges, the determined range is further divided into two. Then, the reference data lying at the border is read out to be compared with the comparison target data. Thereafter, this processing is repeated to narrow the range further until reference data that matches the comparison target data is eventually found.

The operation will now be described in more detail in conjunction with the foregoing example. In the communication data shown in FIG. 5, the number "361" is the comparison target data that follows the position identification data "No.". Since a single space character intervenes between the position identification data "No." and the comparison target data "361", the offset 51 is set to "8" bits in order to exclude the space from the comparison target data. Accordingly, the binary search circuit 36 skips the first "8" bits, or 1 byte, of the communication data subsequent to the position identification data "No." and reads the following "361" as the comparison target data.

Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 7:
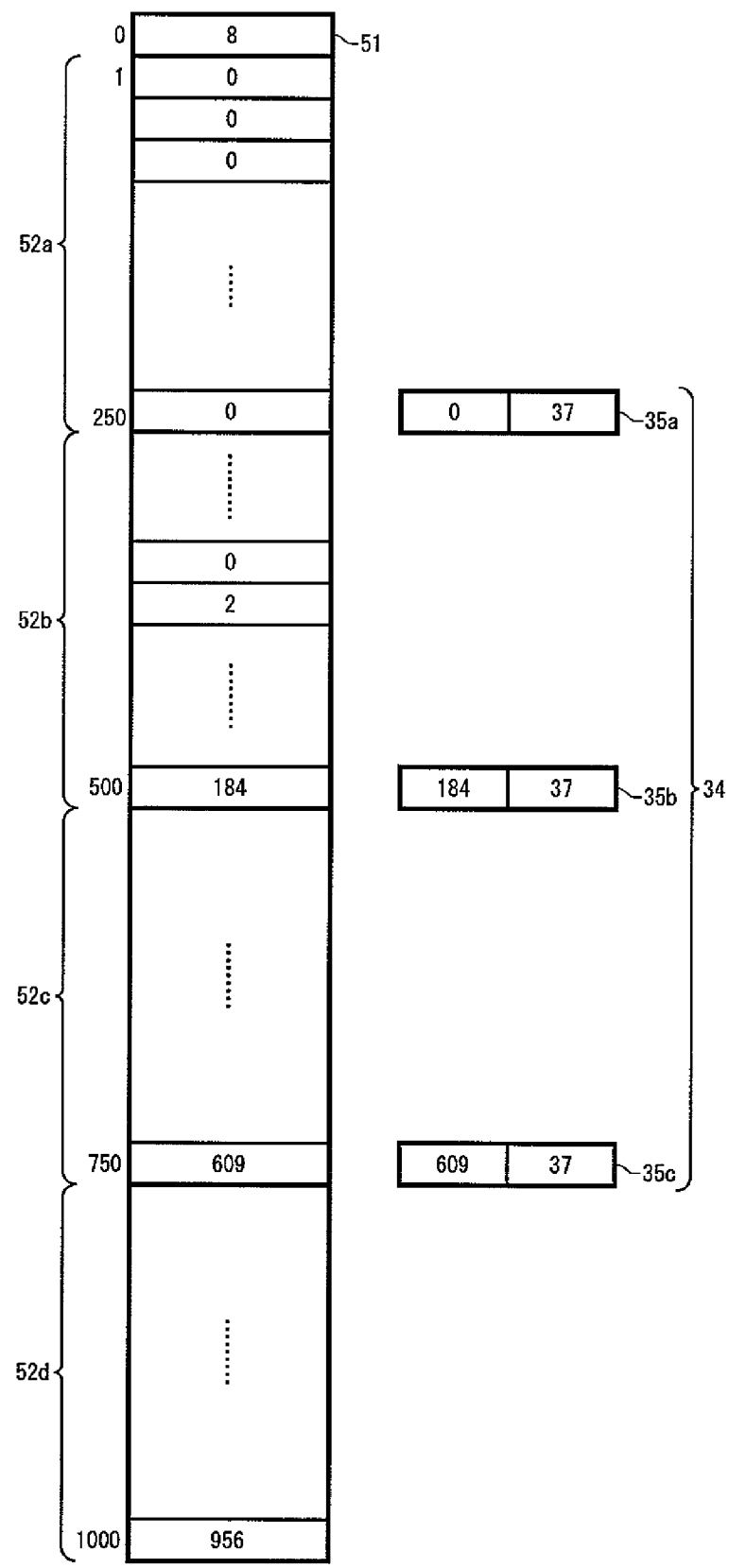
FIG. 7 is a diagram that shows another example of internal data of the first database.

FIG. 7 shows another example of internal data of the first database. In the example shown in FIG. 7, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the maximum time necessary for a binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during a binary search. The comparison technique described above can be implemented by configuring the search circuit 30 with a dedicated hardware circuit.

Figure 8:
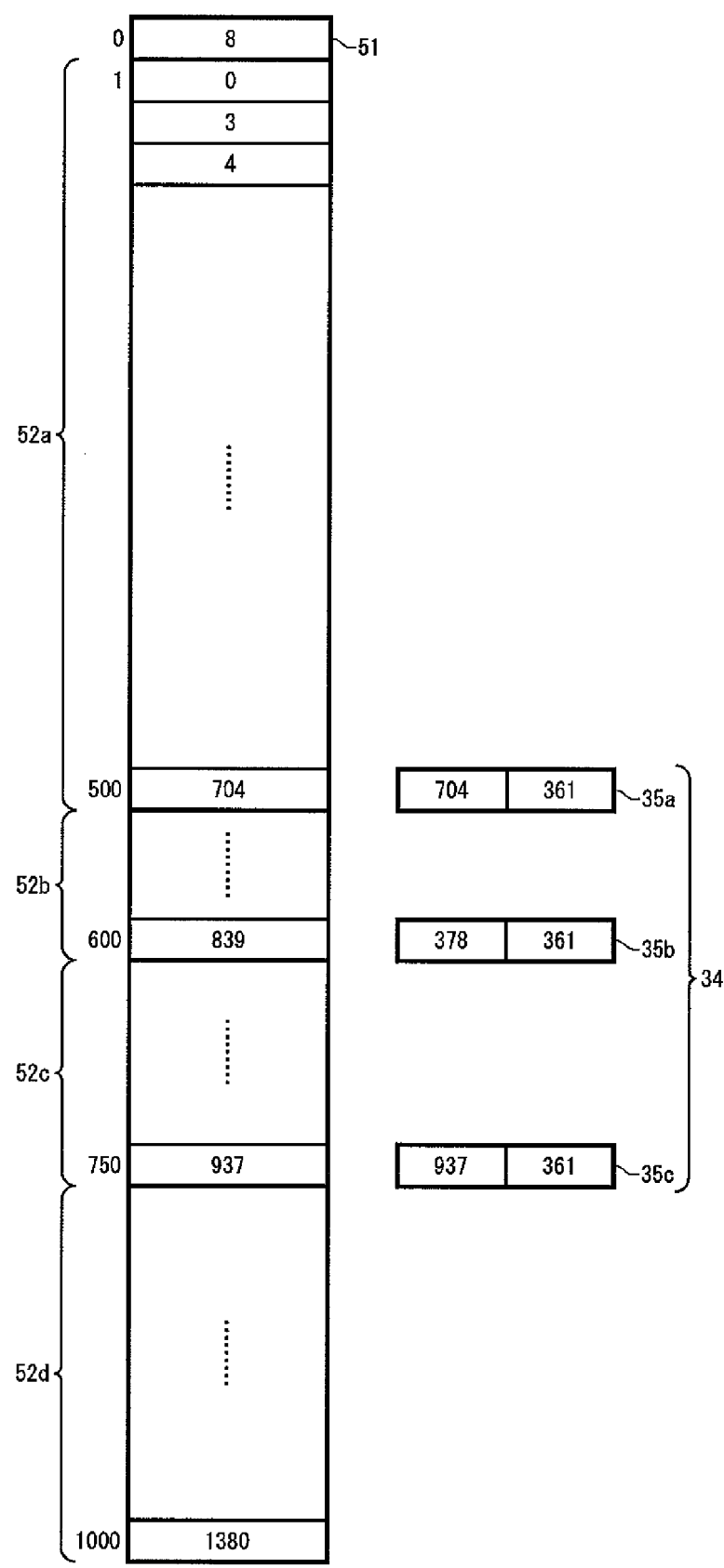
FIG. 8 is a diagram that shows yet another example of internal data of the first database.

FIG. 8 shows yet another example of internal data of the first database. In the example shown in FIG. 8, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 9:
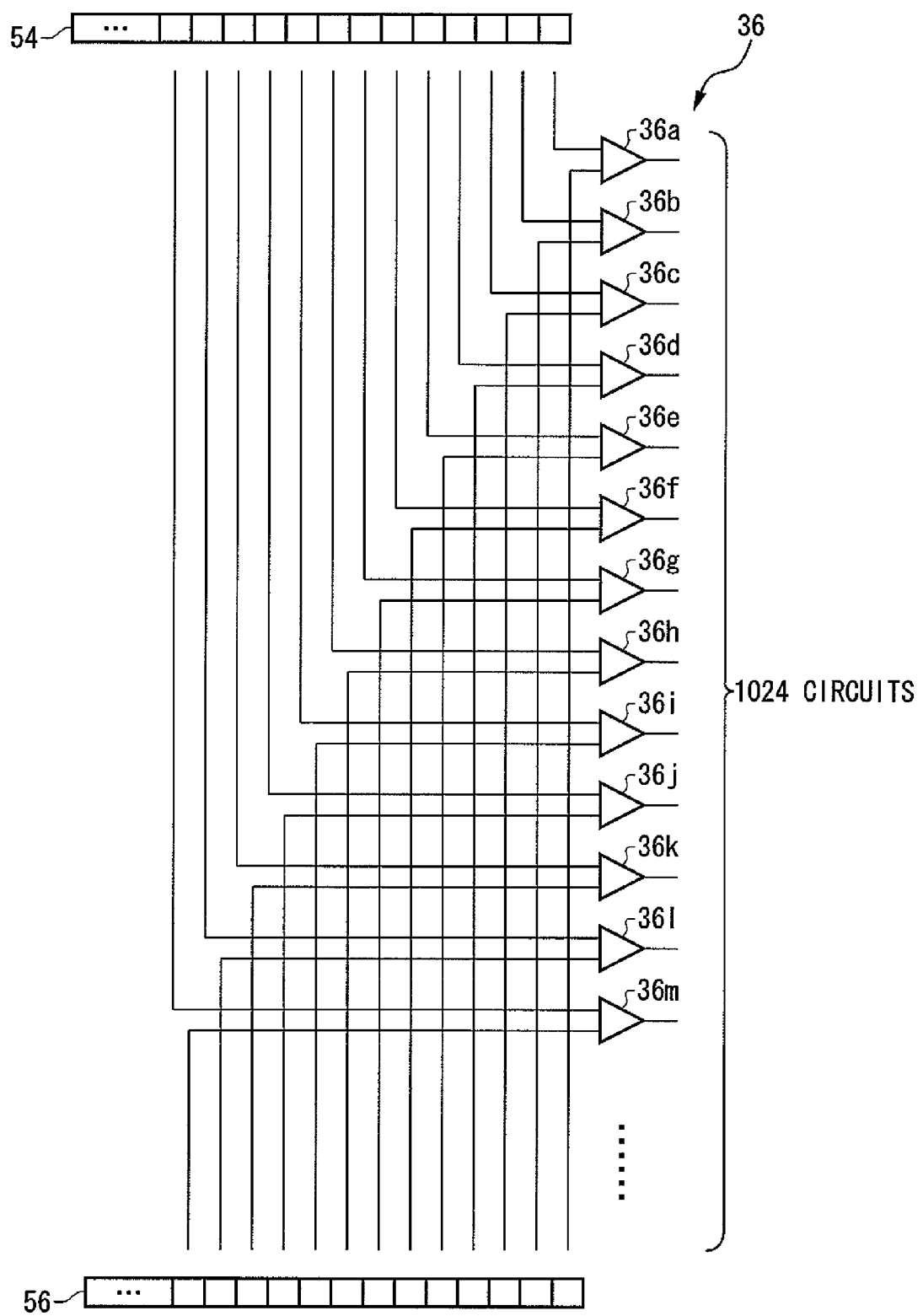
FIG. 9 is a diagram that shows a configuration of comparison circuits included in a binary search circuit.

FIG. 9 shows a configuration of comparison circuits included in the binary search circuit. As mentioned previously, the binary search circuit 36 includes 1024 comparison circuits, such as 36a, 36b, . . . . Each of the comparison circuits 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

FIG. 10 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 10, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 11 shows another example of internal data of the second database. In the example of FIG. 11, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 11, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

Figure 12:
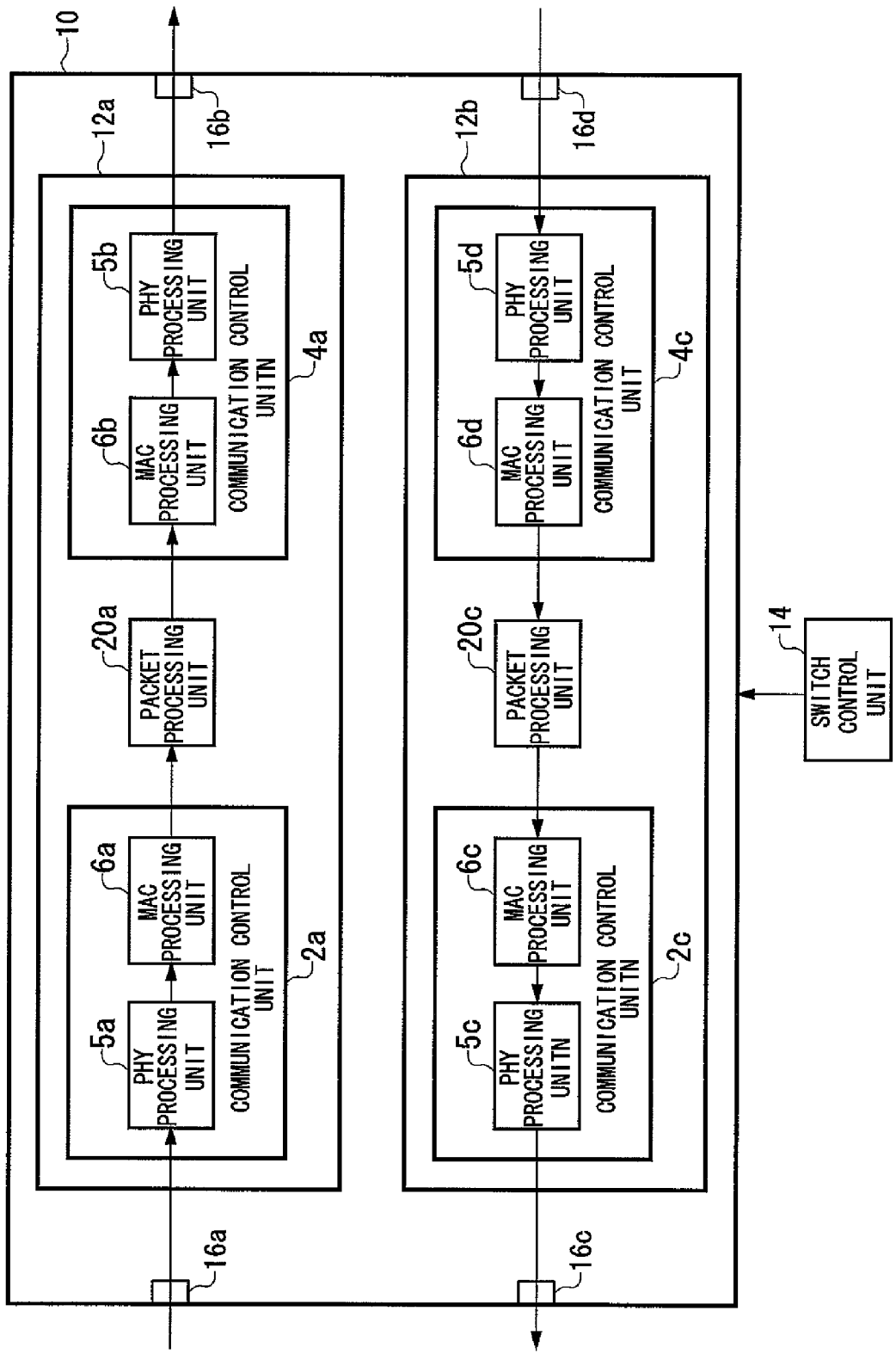
FIG. 12 is a diagram that shows another illustrative configuration of the communication control apparatus according to the base technology.

FIG. 12 shows another illustrative configuration of the communication control apparatus in the base technology. The communication control apparatus 10 shown in this diagram has two communication control units 12, each of which has the same configuration as the communication control apparatus 10 shown in FIG. 3. There is also provided a switch control unit 14 for controlling the operation of the individual communication control units 12. Each of the communication control units 12 has two input/output interfaces 16 and is connected to two networks, upstream and downstream, via the respective input/output interfaces 16. The communication control units 12 receive communication data from either one of the networks and output processed data to the other. The switch control unit 14 switches the inputs and outputs of the input/output interfaces 16 provided for the individual communication control units 12, thereby switching the directions of the flow of communication data in the communication control units 12. This allows communication control not only in one direction but also in both directions.

The switch control unit 14 may provide control such that: either one of the communication control units 12 processes inbound packets and the other processes outbound packets; both the units process inbound packets; or both the units process outbound packets. Consequently, the directions of communications to control can be changed depending on, for example, the traffic status or intended purpose.

The switch control unit 14 may acquire the operating state of the respective communication control units 12 and may switch the direction of communication control according thereto. For example, when one of the communication control units 12 is in a standby state and the other communication control unit 12 is in operation, the unit on standby may be activated as a substitute upon detection of the unit in operation stopping due to a failure or other reasons. This can improve the fault tolerance of the communication control apparatus 10. Also when one of the communication control units 12 needs maintenance such as a database update, the other communication control unit 12 may be operated as a substitute. Thus, appropriate maintenance can be performed without halting the operation of the communication control apparatus 10.

The communication control apparatus 10 may be provided with three or more communication control units 12. The switch control unit 14 may, for example, acquire the traffic status to control the direction of communications in the respective communication control units 12 so that more communication control units 12 are allocated for communication control processing in a direction handling higher traffic. This minimizes a drop in the communication speed, even when the traffic increases in one direction.

The plurality of communication control units 12 may share a part of the communication control unit 2 or 4. The units may also share a part of the packet processing circuit 20, too.

For the data processing apparatus stated above, the following aspects may be provided.

[Aspect 1]

A data processing apparatus comprising:

a first memory unit which contains reference data to be referred to when determining contents of processing to be performed on acquired data;

a search section which searches the data for the reference data by comparing the data and the reference data;

a second memory unit which stores a result of search obtained by the search section and the contents of processing in association with each other; and a processing section which performs the processing associated with the result of search on the data, based on the result of search, wherein the search section is composed of a wired logic circuit.

[Aspect 2]

The data processing apparatus of Aspect 1, wherein the wired logic circuit includes a plurality of first comparison circuits which compare the data with the reference data bit by bit.

[Aspect 3]

The data processing apparatus of Aspect 1, wherein the search section includes a position detection circuit which detects in the data a position of comparison target data to be compared with the reference data.

[Aspect 4]

The data processing apparatus of Aspect 3, wherein the position detection circuit includes a plurality of second comparison circuits which compare the data with position identification data for identifying the position of the comparison target data, and wherein the plurality of second comparison circuits receive the data, each having a shift of a predetermined data length, and compare the data with the position identification data simultaneously in parallel.

[Aspect 5]

The data processing apparatus of Aspect 1 or 2, wherein the search section includes a binary search circuit which searches the data for the reference data by binary search.

[Aspect 6]

The data processing apparatus of Aspect 5, wherein, when the number of pieces of the reference data is smaller than the number of pieces of data storable in the first memory unit, the reference data is stored in the first memory unit in descending order from the last data position, while 0 is stored in the rest of the data.

[Aspect 7]

The data processing apparatus of any one of Aspects 1 to 6, wherein the search section includes a determination circuit which determines which range the comparison target data to be compared with the reference data pertains to, out of three or more ranges into which the plurality of pieces of reference data stored in the first memory unit are divided.

[Aspect 8]

The data processing apparatus of Aspect 7, wherein the determination circuit include a plurality of third comparison circuits which compare reference data at borders of the ranges with the comparison target data so that the plurality of third comparison circuits determine which of the three or more ranges the comparison target data pertains to simultaneously in parallel.

[Aspect 9]

The data processing apparatus of Aspect 8, wherein the reference data stored in predetermined positions of the first memory unit is input to the third comparison circuits as the reference data at the borders.

[Aspect 10]

The data processing apparatus of Aspect 7 or 8, wherein the ranges are determined depending on a distribution of frequencies of occurrence of the reference data in the data.

[Aspect 11]

The data processing apparatus of any one of Aspects 1 to 10, wherein the first memory unit further contains information that indicates the position of the comparison target data in the data, and wherein the search section extracts the comparison target data based on the position-indicating information.

[Aspect 12]

The data processing apparatus of any one of Aspects 1 to 11, wherein the first memory unit or the second memory unit is configured to be rewritable from the outside.

[Aspect 13]

The data processing apparatus of any one of Aspects 1 to 12, wherein, when the search section acquires data in a communication packet to be compared with the reference data, the search section starts comparing the data and the reference data without waiting for the acquisition of all data of the communication packet.

[Aspect 14]

A data processing apparatus comprising a plurality of the data processing apparatuses of any one of Aspects 1 to 13, wherein the data processing apparatuses each have two interfaces which input and output data from/to communication lines, and the direction of processing of the data is changeably controlled by switching the inputs and outputs of the respective interfaces.

Next, a URL filtering technique using the communication control apparatus 10 discussed above will be described.

Figure 13:
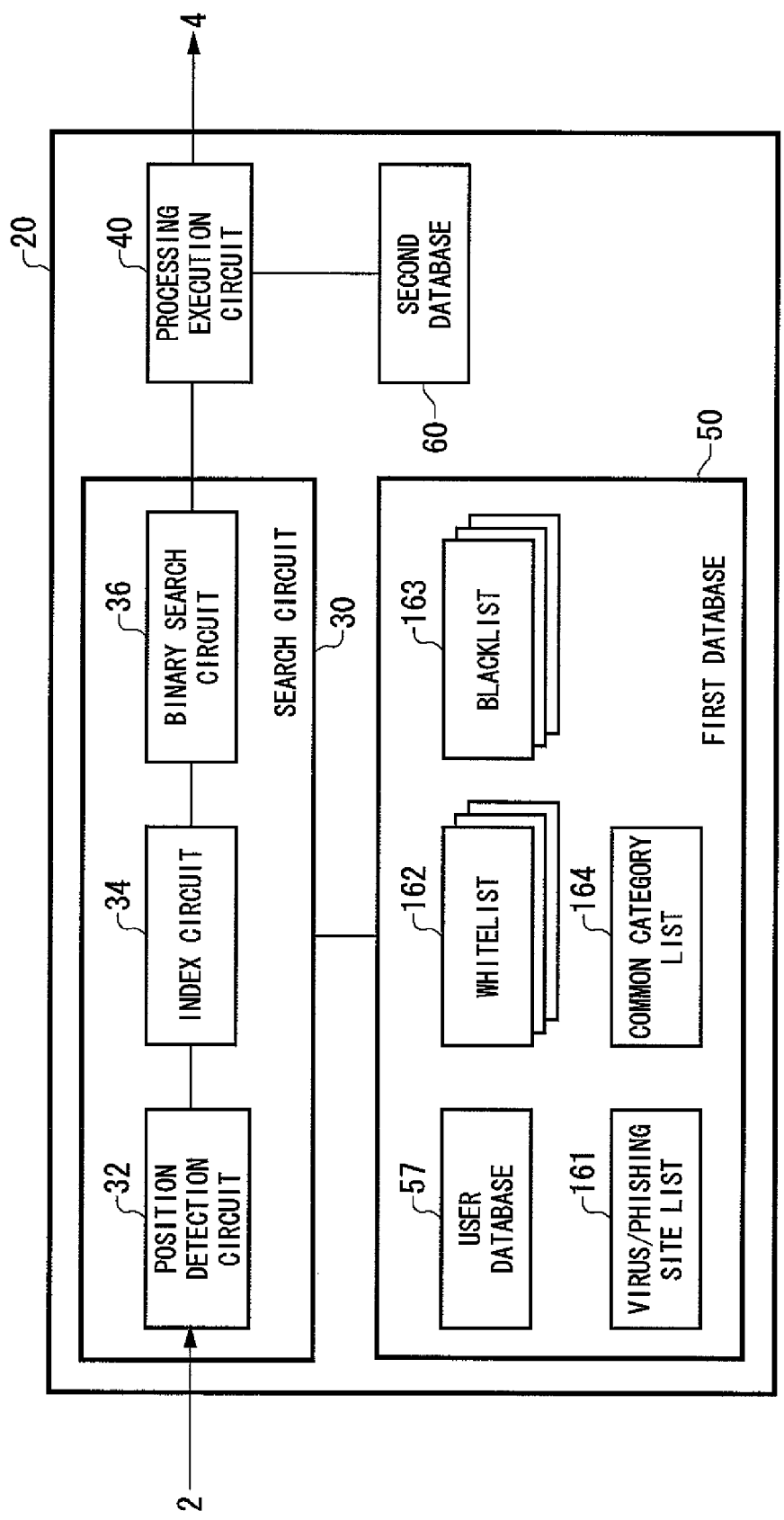
FIG. 13 is a diagram that shows an internal configuration of the packet processing circuit used for URL filtering.

FIG. 13 shows an internal configuration of the packet processing circuit 20 used for URL filtering. The packet processing circuit 20 comprises, as the first database 50, a user database 57, a virus/phishing site list 161, a whitelist 162, a blacklist 163 and a common category list 164. The user database 57 stores information on users who use the communication control apparatus 10. The communication control apparatus 10 receives, from a user, information for identifying the user, and performs matching between the information received by the search circuit 30 therein and the user database 57 to authenticate the user. For the user-identifying information, a source address stored in the IP header of a TCP/IP packet, or a user ID and a password provided by a user may be used. In the former case, storage location of a source address in a packet is already known. Accordingly, when the search circuit 30 performs matching with the user database 57, the position detection circuit 32 need not detect the position, and the only thing required there is to specify, as the offset 51, the storage location of the source address. After the user is authenticated as a user registered in the user database 57, the URL of a content is checked against the virus/phishing site list 161, whitelist 162, blacklist 163 and common category list 164, in order to determine whether or not the access to the content should be permitted. The whitelist 162 and blacklist 163 are provided for each user, and when a user ID is uniquely specified after the user authentication, the whitelist 162 and blacklist 163 for the user are provided to the search circuit 30.

The virus/phishing site list 161 contains a list of URLs of contents containing computer viruses, and a list of URLs of "trap" sites used for phishing. If a URL is contained in the virus/phishing site list 161, a request for access to the content having such URL will be denied. Therefore, even when a user is about to access, unconsciously or by a trick, a virus site or phishing site, the access can be appropriately prohibited, thereby protecting the user from a virus or phishing fraud. Also, since the access restrictions are collectively provided by the communication control apparatus 10 on a communication path, not by a user terminal with a list of virus sites or phishing sites stored therein, more reliable and efficient access restrictions can be achieved. The communication control apparatus 10 may acquire and maintain a list of authenticated sites, which have been certified by certification authorities as valid and as not virus sites or phishing sites, to permit access to URLs contained in the list. Also, in a case where a valid website is hacked and a virus is embedded therein or the valid site is used for phishing, the operator of the valid site may register the URL of such hacked website in the virus/phishing site list 161, so as to temporarily prohibit the access to the website until the website is recovered. In addition to the URL list, other information such as IP numbers, TCP numbers and MAC addresses may be checked in combination. Accordingly, prohibition conditions can be set more accurately, thereby ensuring the filtering of virus sites or phishing sites.

The whitelist 162 is provided for each user and contains a list of URLs of contents to which access is permitted. The blacklist 163 is also provided for each user but contains a list of URLs of contents to which access is prohibited. FIG. 14A shows an example of internal data of the virus/phishing site list 161. Similarly, FIG. 14B shows an example of internal data of the whitelist 162, and FIG. 14C shows that of the blacklist 163. Each of the virus/phishing site list 161, whitelist 162 and blacklist 163 contains a category number field 165, a URL field 166 and a title field 167. The URL field 166 contains a URL of a content to which access is permitted or prohibited. The category number field 165 contains a category number of a content. The title field 167 contains a title of a content.

The common category list 164 contains a list for classifying contents represented by URLs into multiple categories. FIG. 15 shows an example of internal data of the common category list 164. The common category list 164 also contains the category number field 165, URL field 166 and title field 167.

The communication control apparatus 10 extracts a URL included in a "GET" request message or the like and searches the virus/phishing site list 161, whitelist 162, blacklist 163 and common category list 164 for the URL using the search circuit 30. At this time, a character string "http://", for example, may be detected by the position detection circuit 32 so as to extract the subsequent data string as target data. Then, the index circuit 34 and binary search circuit 36 perform matching between the extracted URL and the reference data in the virus/phishing site list 161, whitelist 162, blacklist 163 and common category list 164.

FIGS. 16A, 16B, 16C and 16D show examples of internal data of the second database 60 used for URL filtering. FIG. 16A shows the search result and processing content with respect to the virus/phishing site list 161. If a URL included in a GET request or the like matches a URL included in the virus/phishing site list 161, the access to the URL will be prohibited. FIG. 16B shows the search result and processing content with respect to the whitelist 162. If a URL included in a GET request or the like matches a URL included in the whitelist 162, the access to the URL will be permitted. FIG. 16C shows the search result and processing content with respect to the blacklist 163. If a URL included in a GET request or the like matches a URL included in the blacklist 163, the access to the URL will be prohibited.

FIG. 16D shows the search result and processing content with respect to the common category list 164. As shown in FIG. 16D, a user can determine, with respect to each of the categories, the permission or prohibition of the access to contents belonging to the category, in relation to the results of search through the common category list 164. The second database 60 for the common category list 164 contains a user ID field 168 and a category field 169. The user ID field 168 contains an ID for identifying a user. The category field 169 contains information that indicates the permission or prohibition of the access to contents belonging to respective categories, which is determined by a user for each of 57 categories classified. If a URL included in a GET request matches a URL included in the common category list 164, the permission for the access to the URL will be determined according to the category that the URL belongs to and the user ID. Although the number of common categories is 57 in FIG. 16D, it is not limited thereto.

Figure 17:
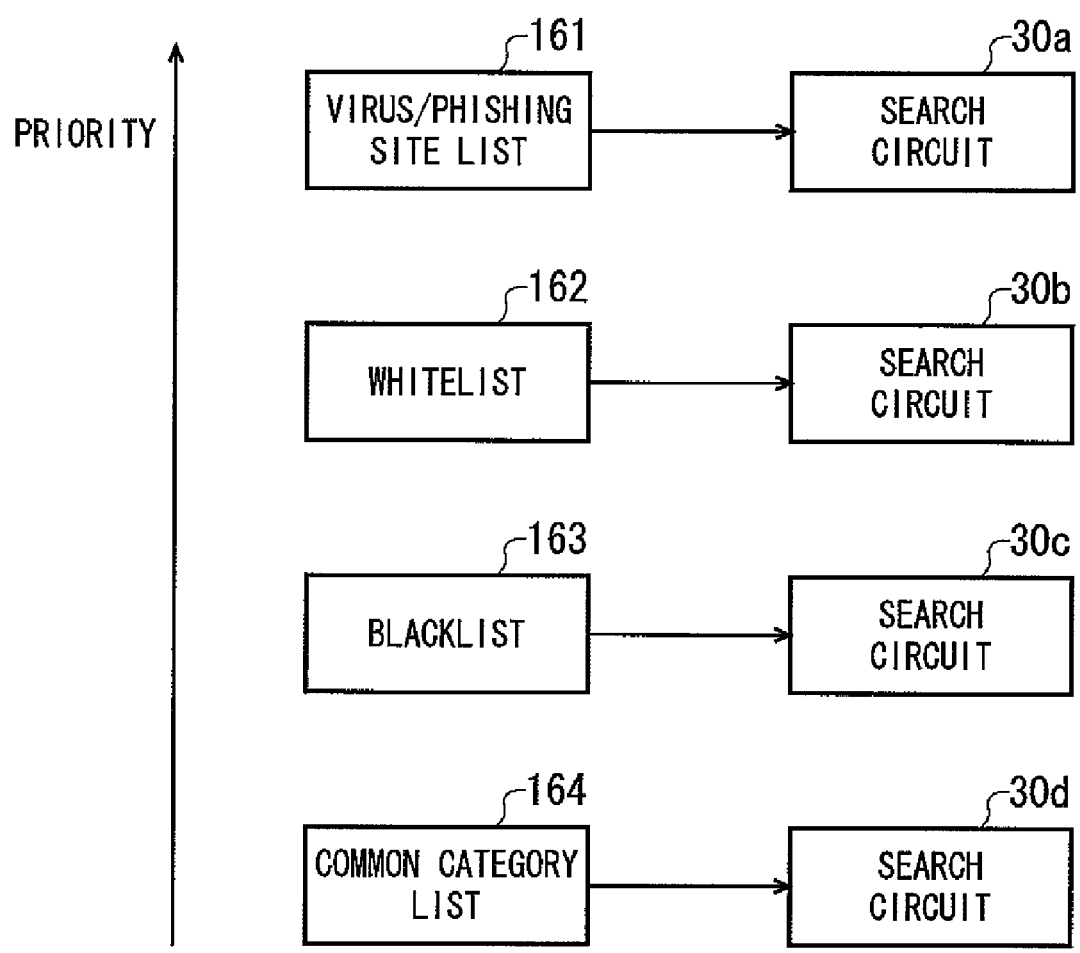
FIG. 17 is a diagram that shows the priorities of the virus/phishing site list, whitelist, blacklist and common category list.

FIG. 17 shows the priorities of the virus/phishing site list 161, whitelist 162, blacklist 163 and common category list 164. In the base technology, the virus/phishing site list 161, whitelist 162, blacklist 163 and common category list 164 have higher priorities in this order. For example, even though a URL of a content appears in the whitelist 162 and the access thereto is permitted therein, the access will be prohibited if the URL also appears in the virus/phishing site list 161, as it is determined that the content contains a computer virus or is used for phishing.

When conventional software-based matching is performed in consideration of such priorities, the matching is performed on the lists, for example, in descending order of priority and the first match is employed. Alternatively, the matching is performed on the lists in ascending order of priority, and the latest match is employed to replace the preceding match. In the base technology using the communication control apparatus 10 configured with a dedicated hardware circuit, in contrast, there are provided a search circuit 30a for performing matching with respect to the virus/phishing site list 161, a search circuit 30b for performing matching with respect to the whitelist 162, a search circuit 30c for performing matching with respect to the blacklist 163, and a search circuit 30d for performing matching with respect to the common category list 164; these search circuits 30 perform matching simultaneously in parallel. When matches are found in multiple lists, the one with the highest priority is employed. Thus, even when multiple databases are provided and the priorities thereof are defined, the search time can be reduced remarkably.

The priorities of the virus/phishing site list 161, whitelist 162, blacklist 163 and common category list 164, with which the permission of access is determined, may be provided in the second database 60, for example. The conditions in the second database 60 may be modified depending on the priorities of the lists.

Therefore, when performing filtering based on URLs using multiple databases, by defining priorities of the databases to perform filtering according thereto, and also by providing the highest priority to the filtering in the virus/phishing site list 161, access to a virus site or phishing site can be certainly prohibited, irrespective of the conditions in the whitelist 162 or the like defined by the user. This can appropriately protect users from viruses or phishing fraud.

When access to a content is permitted, the process execution circuit 40 outputs a signal to the message output server 130 to convey the permission. The message output server 130 then transmits a "GET" request message to the server retaining the content. When access to a content is prohibited, the process execution circuit 40 outputs a signal to the message output server 130 to convey the prohibition, and the message output server 130 then discards a "GET" request message for the server of access destination without transmitting it. At this time, a response message conveying the prohibition of the access may be transmitted to the request source. Alternatively, transfer to another web page may be forced. In this case, the process execution circuit 40 changes the destination address and URL to those of the transfer destination and transmits the "GET" request message. Information including such response message or URL of the transfer destination may be stored in the second database 60 or message output server 130.

The message output server 130 may confirm that the request source exists using a ping command or the like, and may subsequently check the condition of the request source before outputting a message thereto. A message transmitted from the message output server 130 to the request source may be determined for each user, for each content or each category of contents to be accessed, or for each database such as the whitelist 162 or blacklist 163. For example, the screen displayed when access is prohibited may be customized by a user and registered in the message output server 130. Also, as stated previously, when a valid website is hacked and the access thereto is temporarily restricted, a message may be output in order to direct users to a mirror site of the valid site.

The message output server 130 may manage the history of message transmission so that the history information may be used for various kinds of control. For example, when a number of access requests are transmitted from the same request source for a short time, since it may possibly be a denial-of-service attack (DoS attack), such request source may be registered in an access denial list so as to block packets from the request source without transmitting them to the request destination. Also, the history of message transmission may be statistically processed to be provided to the operator of the website, etc. Accordingly, the history of user access can be used for marketing, control of communication status or other purposes. The number of message transmission may be decreased or increased depending on the situation. For example, when an access request is transmitted from a certain IP number, messages to be transmitted can be increased manyfold in response to the single request message.

With the configuration and operation as described above, access to an inappropriate content can be prohibited. Also, since the search circuit 30 is a dedicated hardware circuit configured with FPGA, etc., high-speed search processing can be achieved, as discussed previously, and filtering process can be performed with minimal effect on the traffic. By providing such filtering service, an Internet service provider can provide added value, thus gaining more users.

The whitelist 162 or blacklist 163 may be mutually provided for all users.

Embodiment

There will now be described an operating technique for the case where multiple communication control apparatuses 10 are provided in the communication control system 100. For example, it is assumed that, in the aforementioned communication control apparatus 10 for performing filtering control using URLs, the storage apparatus for storing capacity for storing data of 100,000 users. In such case, databases, such as a RAM (Random Access Memory), has a if the number of users of the communication control system 10 exceeds 100,000, the communication control apparatus 10 will need to be replaced with another communication control apparatus 10 that has a storage apparatus capable of storing data of over 100,000 users. In the technique of the present embodiment, on the other hand, multiple communication control apparatuses are provided, and each of them has a storage apparatus for storing a share of databases including the whitelist 162 and blacklist 163. By operating such apparatuses cooperatively, they can function as one large communication control apparatus 10. Therefore, even if the number of users exceeds the capacity of the communication control apparatus 10, such increase of users can be handled by newly adding a communication control apparatus. In this way, the present embodiment proposes a technique for operating the communication control apparatus 10 that is versatile and flexible. Such technique can reduce man-hours and costs required for system modification due to increase of users. In addition, initial investment can be also reduced because a large scale system does not has to be constructed at the beginning in expectation of increase of users; only an appropriate number of communication control apparatuses need to be provided based on the number of users, instead.

Figure 18:
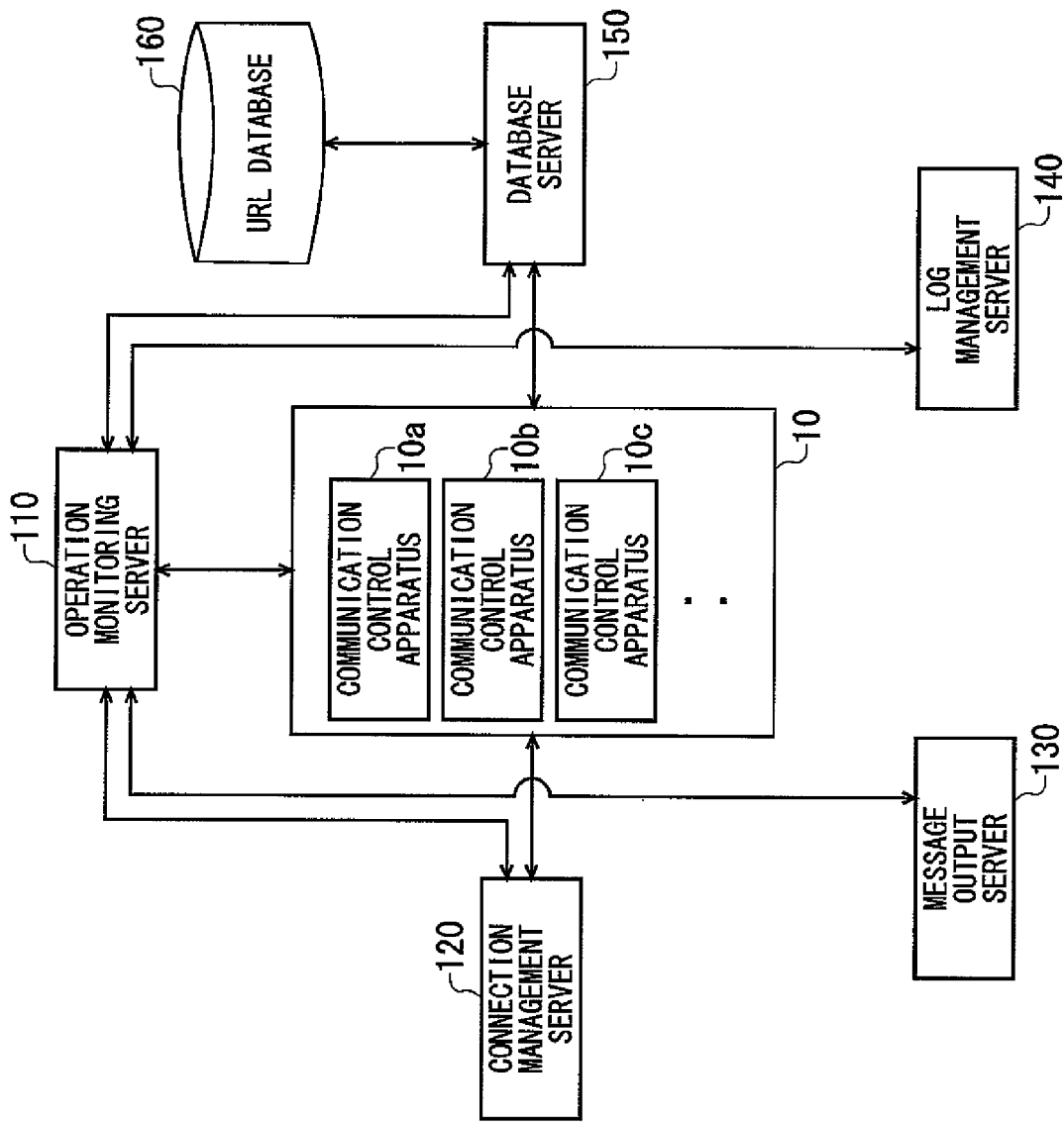
FIG. 18 is a diagram that shows a configuration of a communication control system according to an embodiment.

FIG. 18 shows a configuration of the communication control system 100 according to the embodiment. In the communication control system 100 of the present embodiment are provided multiple communication control apparatuses 10a, 10b, 10c, etc., which are cooperatively operated to function as the communication control apparatus 10 described in the base technology. Other configurations and operations are the same as those of the communication control system 100 according to the base technology shown in FIG. 1.

In the communication control system 100 of the present embodiment are provided as many as the number of communication control apparatuses required to share and store at least part of databases necessary for packet processing, and at least one more apparatus is provided extra. In the aforementioned example, when the number of users is 300,000 or above but less than 400,000, the number of communication control apparatuses required for operation is four. However, one or more communication control apparatuses should be further provided as standby units in case any of the communication control apparatuses in operation fails or in case a database in any of the communication control apparatuses is updated. Accordingly, at least five communication control apparatuses are provided in total. Conventionally, the entire system has needed to be duplexed considering fault tolerance. According to the technique of the present embodiment, in contrast, a divided unit of the communication control apparatus 10 may be only provided extra, thereby enabling cost reduction. The operating state of the multiple communication control apparatuses 10a, 10b, 10c, etc. is managed by the operation monitoring server 110. The operation monitoring server 110 of the present embodiment has a management table for managing the operating state of the communication control apparatuses.

Figure 19:
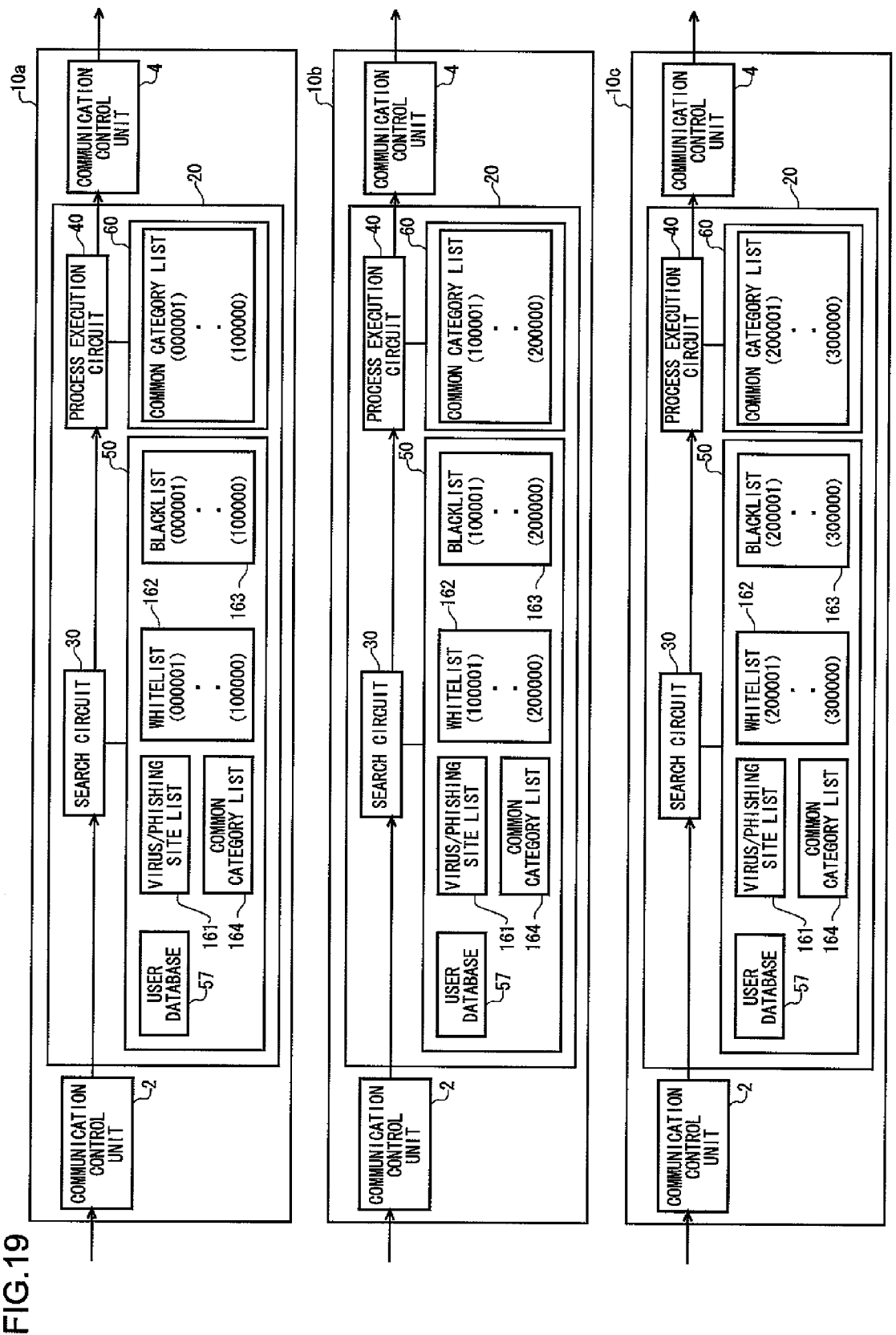
FIG. 19 is a diagram that shows configurations of communication control apparatuses according to the embodiment.

FIG. 19 shows configurations of the communication control apparatuses 10 according to the present embodiment. In the configuration shown in FIG. 19, the search circuit 30 and process execution circuit 40 correspond to a data processing unit, and the configuration retaining the first database 50 and second database 60 corresponds to a data retaining unit in the present invention. In the example shown in FIG. 19, a data retaining unit and the corresponding data processing unit are provided in each of the communication control apparatuses 10a, 10b and 10c. These communication control apparatuses may be collectively provided in a single apparatus. Also, a single data processing unit may refer to databases stored in multiple data retaining units to process data. The data retaining unit may be a storage apparatus, such as a RAM, or may be a part of the area in the storage apparatus. Also, multiple storage apparatuses may be considered as one data retaining unit.

Among the databases used for packet processing in the communication control apparatuses 10, the whitelist 162 (FIG. 14B) and blacklist 163 (FIG. 14C) in the first database 50, and a portion of the common category list in which access permission is determined for each user (FIG. 16D) in the second database 60 need larger capacity in proportion to the increasing number of users. Accordingly, these databases are divided into portions to be stored by the data retaining units of the communication control apparatuses 10a, 10b, 10c, etc. Such database, i.e. the whitelist 162 or blacklist 163, corresponds to the secondary database in the present invention. Since the virus/phishing site list 161 (FIG. 14A) and common category list 164 (FIG. 15) are mutually used by all users and do not need very large capacity, these lists are mutually stored in the data retaining units of all the communication control apparatuses 10a, 10b, 10c, etc.

As will be discussed later, in the communication control system 100 of the present embodiment, a communication packet to be processed is sent to all the communication control apparatuses 10a, 10b, 10c, etc. in operation, and the respective communication control apparatuses then determine whether or not to process the packet. Thereafter, only the communication control apparatus that handles processing of the packet, i.e. the communication control apparatus that retains data of the user who has sent the packet, processes the packet, and the other communication control apparatuses discard the packet. Therefore, the user database 57 is essential as it stores data for determining which communication control apparatus is used to process the packet, and hence, packets cannot be processed without the user database 57. Accordingly, the user database 57 is mutually retained in all the communication control apparatuses. The user database 57 corresponds to the primary database in the present invention.

In the present embodiment, each of the communication control apparatuses 10a, 10b, 10c, etc. stores the user database 57 containing data of all users. Each of the communication control apparatuses is notified by the operation monitoring server 110 of the range of user IDs assigned to users whom the communication control apparatus should handle. Each of the apparatuses then refers to the data of user IDs within the notified range in the user database 57 to authenticate a user, and determines whether or not to process a packet that the apparatus has received.

FIG. 20 shows an example of internal data of a management table 111 provided in the operation monitoring server 110. The management table 111 includes apparatus ID fields 112, operating state fields 113 and user ID fields 114. The apparatus ID fields 112 contain the apparatus IDs of the communication control apparatuses 10a, 10b, etc. The operating state fields 113 contain the operating state of the communication control apparatuses, and the user ID fields 114 contain the ranges of user IDs handled by the communication control apparatuses. The operating state appears as "operating", "standby", "failure", "data updating", etc. The operating state fields 113 are updated by the operation monitoring server 110 each time the operating state of the communication control apparatuses 10a, 10b, etc. changes. In the example shown in FIG. 20, "465183" users are using the communication control system 100, so that the five communication control apparatuses 10 having the apparatus IDs "1"-"5" are in operation while the communication control apparatus 10 having the apparatus ID "6" is in a standby state.

The operation monitoring server 110 monitors the operating state of multiple communication control apparatuses 10. When detecting any of the communication control apparatuses 10 being inoperable because of some trouble, the operation monitoring server 110 stores, in the communication control apparatus 10 on standby, the same data as stored in the inoperable apparatus, and places the standby communication control apparatus 10 in operation. For example, when the communication control apparatus 10 with the apparatus ID "2" halts the operation because of a failure, as shown in FIG. 21, the communication control apparatus 10 with the apparatus ID "6", which has been on standby, stores the data of user IDs "100001-200000" and starts operating. Thus, even if a communication control apparatus 10 stops because of some trouble, the main operation will be continued properly. The communication control apparatus 10 on standby may store any of the data in advance to be made in a hot standby state, or may be in a cold standby state.

In the present embodiment, the data retaining unit of the communication control apparatus 10 on standby stores the user database 57 in advance. Accordingly, even if a communication control apparatus 10 becomes inoperable, the communication control apparatus 10 on standby can be placed in operation promptly. As mentioned previously, each of the communication control apparatuses 10 determines whether or not to process a packet using user IDs. Therefore, if a communication control apparatus 10 becomes inoperable, and if the system then receives a packet from a user handled by that communication control apparatus 10, there will be no communication control apparatus 10 for processing the packet, and hence, the packet will remain unprocessed. In order to recover from such situation as quickly as possible, the data retaining unit of the communication control apparatus 10 on standby stores the user database 57 in advance, and the operation monitoring server 110 notifies the standby apparatus of the range of user IDs handled by the inoperable communication control apparatus 10 so that the standby communication control apparatus 10 can handle the users instead. Consequently, the communication control apparatus 10 on standby can be placed in operation promptly, so that the chance that a packet remains unprocessed can be minimized.

If the communication control apparatus 10 on standby stores all the databases including the whitelist 162 and blacklist 163 before the apparatus is placed in operation, the situation of a packet remaining unprocessed could continue for a long time because the storing of the databases requires time. Therefore, the communication control apparatus 10 on standby may be placed in operation when only the user database 57 is stored therein. Although this cannot provide the complete URL filtering service, the situation of packets remaining unprocessed can be avoided. The databases that have not yet been stored may be stored during maintenance or database updating, which will be described later. The databases that are mutually used, such as the virus/phishing site list 161 and common category list 164, may be also stored in the communication control apparatus 10 on standby in advance. Accordingly, when the standby apparatus is placed in operation, part of the service such as denying access to URLs contained in the virus/phishing site list 161 can be provided.

Next, the procedure for updating databases stored in the communication control apparatuses 10 will be described. The database server 150 acquires the latest database from the URL database 160 at a certain time and retains it therein. The database server 150 also updates the user database upon registration of a new user or withdrawal of a user registration and retains it therein. In order to reflect, in a communication control apparatus 10, the latest database retained in the database server 150, the operation monitoring server 110 transfers the data from the database server 150 and stores it in the communication control apparatus 10 at a certain time.

FIGS. 22A, 22B and 22C are diagrams for describing the procedure for updating databases. As with FIG. 20, FIG. 22A shows that the communication control apparatuses 10 with the apparatus IDs "1"-"5" are in operation while the communication control apparatus 10 with the apparatus ID "6" is on standby. At the time when a database is to be updated, the operation monitoring server 110 identifies the communication control apparatus 10 in a standby state then and instructs the database server 150 to store the data in the communication control apparatus 10. In the example shown in FIG. 22A, the communication control apparatus 10 with the apparatus ID "6" is on standby, so that the database server 150 stores the data in that apparatus. The operation monitoring server 110 then changes the operating state field 113 for the apparatus ID "6" to "data updating".

FIG. 22B shows a state where a database of a communication control apparatus 10 is being updated. The database server 150 stores, in the user database 57 in the communication control apparatus 10 with the apparatus ID "6" on standby, the data of users handled by one of the communication control apparatuses 10 in operation. The data of the virus/phishing site list 161, whitelist 162, blacklist 163, common category list 164 and second database 60 are also stored therein. In the example shown in FIG. 22B, the data of users with the user IDs "000001-100000", which have been handled by the communication control apparatus 10 with the apparatus ID "1", are stored in the communication control apparatus 10 with the apparatus ID "6".

FIG. 22C shows a state where the communication control apparatus 10 with the apparatus ID "6" has had its database updated and is placed in operation, and the communication control apparatus 10 with the apparatus ID "1" is placed into a standby state instead. Upon completion of storing data in the communication control apparatus 10 with the apparatus ID "6", the operation monitoring server 110 starts the operation of the apparatus, which stores the updated database. The operation monitoring server 110 also stops the operation of the communication control apparatus 10 with the apparatus ID "1", which stores the database before update, to place the apparatus into a standby state. Thus, the communication control apparatus 10 with an updated database is placed in operation. Then, the data of users with the user IDs "100001-200000" are stored in the communication control apparatus 10 with the apparatus ID "1" before the apparatus is placed in operation, and, subsequently, the operation of the communication control apparatus 10 with the apparatus ID "2" is stopped. Thereafter, databases are similarly updated by turns, so that the databases of all the communication control apparatuses 10 can be updated behind the actual operation, without halting the operation of the communication control system 100.

In this way, data stored in each of the communication control apparatuses 10 is not fixed in the present embodiment, and hence, the communication control apparatus 10 that stores data of a certain user changes with time. If, before a packet is sent to each of the communication control apparatuses 10, the process of determining which communication control apparatus 10 stores the data of the user is performed, the time for the process will be additionally required. Accordingly, in the present embodiment, a received packet is provided to all the communication control apparatuses 10, and each of the apparatuses then determines whether or not it stores the data of the user who has sent the packet. Thereafter, only the communication control apparatus 10 that stores the data processes the packet, and the other communication control apparatuses 10 not having the data disregard the packet. In the following, a technique for providing such mechanism will be described.

Figure 23:
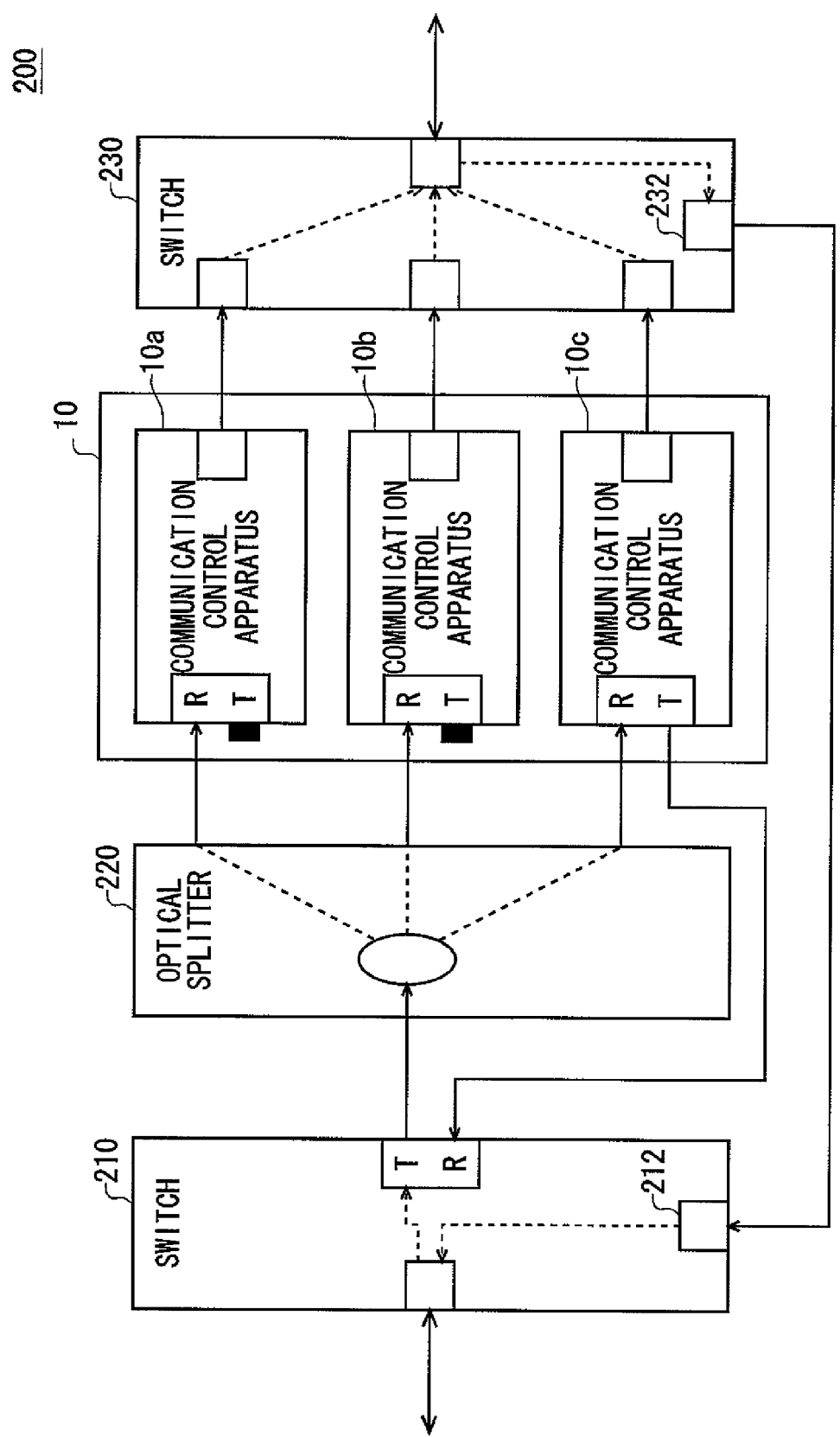
FIG. 23 is a diagram that shows a configuration of a communication path control apparatus provided to process packets with multiple communication control apparatuses.

FIG. 23 shows a configuration of a communication path control apparatus provided to process packets with multiple communication control apparatuses 10. A communication path control apparatus 200 comprises a switch 210, an optical splitter 220, which is an example of a data supply unit, and a switch 230. The switch 210 transmits a received packet to the communication control apparatuses 10. Between the switch 210 and the communication control apparatuses 10, there is provided the optical splitter 220 that provides the packet to the multiple communication control apparatuses 10*a*, 10*b* and 10*c* in parallel. The switch 210 practically transmits a packet to the optical splitter 220, which transmits the packet to each of the communication control apparatuses in parallel.

If a packet is converted to a broadcast packet so as to be transmitted to the multiple communication control apparatuses 10*a*, 10*b* and 10*c*, additional process such as adding a time stamp to the header will be required, which reduces the processing speed. Therefore, a packet is not converted but split by the optical splitter 220 so as to be transmitted as a unicast packet to the multiple communication control apparatuses 10*a*, 10*b* and 10*c*. This method will be called "parallelcast" in the present specification.

Each of the communication control apparatuses is not set to a mode in which an apparatus receives only packets directed to the MAC address of the apparatus, but set to promiscuous mode in which an apparatus receives all packets regardless of the destination MAC addresses. When receiving a packet sent via parallelcast from the optical splitter 220, each of the communication control apparatuses omits MAC address matching and acquires every packet. Each of the apparatuses then refers to the user database 57 stored in the data retaining unit to perform user ID matching as described in the base technology, and determines whether or not the apparatus should process the packet. In the example shown in FIG. 23, since the data of a user who has sent a packet is stored in the communication control apparatus 10*c*, the communication control apparatuses 10*a* and 10*b* discard the packet while the communication control apparatus 10*c* performs the URL filtering as described previously.

If the packet needs to be returned to the user because, for example, the access has been prohibited, the communication control apparatus 10*c* will transmit a response packet to the switch 210 bypassing the optical splitter 220. If the communication control apparatus 10*c* processes the packet and the access thereto is permitted, the communication control apparatus 10*c* will transmit the packet to the destination of the request for the content. Between the communication control apparatuses 10 and the upstream communication line, there is provided the switch 230 by which packets transmitted from the multiple communication control apparatuses 10*a*, 10*b* and 10*c* are aggregated. The communication control apparatus 10*c* will practically transmit the packet to the switch 230, which transmits the packet to the upstream communication line.

When the switch 230 receives a packet transmitted in return from the destination of a request for a content, since this packet need not be processed by the communication control apparatuses 10, the packet is transmitted from the port 232 of the switch 230 to the port 212 of the switch 210. Thereafter, the packet is transmitted from the switch 210 to the user. On the Internet, the transmission path is generally recorded in the packet to ensure the return path through which a response packet sent in return for the packet can be certainly delivered to the transmission source. In the present embodiment, however, since the return path is already provided within the communication path control apparatus 200, communication can be performed between apparatuses without recording the path or processing the packet. Consequently, unnecessary process can be eliminated, thereby improving the processing speed.

The example in FIG. 23 shows the case where, when a user sent a packet including a request for acquiring a content, only the packet sent from the user to the server that retains the content is processed, while a packet transmitted from the server to the user is made to pass through without being processed. Alternatively, the communication path control apparatus 200 may be configured so that the communication control apparatuses 10 process packets transmitted in both directions. In such case, the optical splitters 220 may be provided on both sides of the communication control apparatuses 10. Also, the bypass path from the switch 230 to switch 210 need not be provided.

In such way, by sending a packet via parallelcast to all the communication control apparatuses, the packet can be appropriately processed by the proper communication control apparatus among the multiple communication control apparatuses, without the need to specify, in advance, a communication control apparatus by which the packet is to be processed.

When receiving a packet that does not contain any of the user IDs included in a list of user IDs stored in the user database 57, at least one of the multiple communication control apparatuses may transmit the packet to the network without processing it. Accordingly, when the system receives a packet that any of the communication control apparatuses need not process, the packet can be made to pass through appropriately. If multiple communication control apparatuses make the packet pass through, a plurality of the same packets will be sent out. Therefore, it is desirable that only one of the communication control apparatuses makes the packet pass through. Hereinafter, a communication control apparatus that has such function will be called "primary apparatus", while the other communication control apparatuses will be called "secondary apparatuses".

The operation monitoring server 110 may provide control such as specifying one communication control apparatus as the primary apparatus for performing the function stated above, and specifying the other communication control apparatuses as the secondary apparatuses for processing only packets that the respective apparatuses should handle. In such case, the primary apparatus processes a packet when the user ID contained therein appears in the range of user IDs that the apparatus should handle, among the list of IDs stored in the user database 57. On the other hand, the primary apparatus discards the packet when the user ID contained therein appears in the list of IDs stored in the user database 57 but does not lie within the range of user IDs that the apparatus should handle. Also, when the user ID contained in the packet does not match any of the user IDs stored in the user database 57, the primary apparatus makes the packet pass through without processing it. A secondary apparatus processes only a packet containing a user ID included in the range of user IDs that the apparatus should handle, among the list of IDs stored in the user database 57, and discards the other packets.

Figure 24:
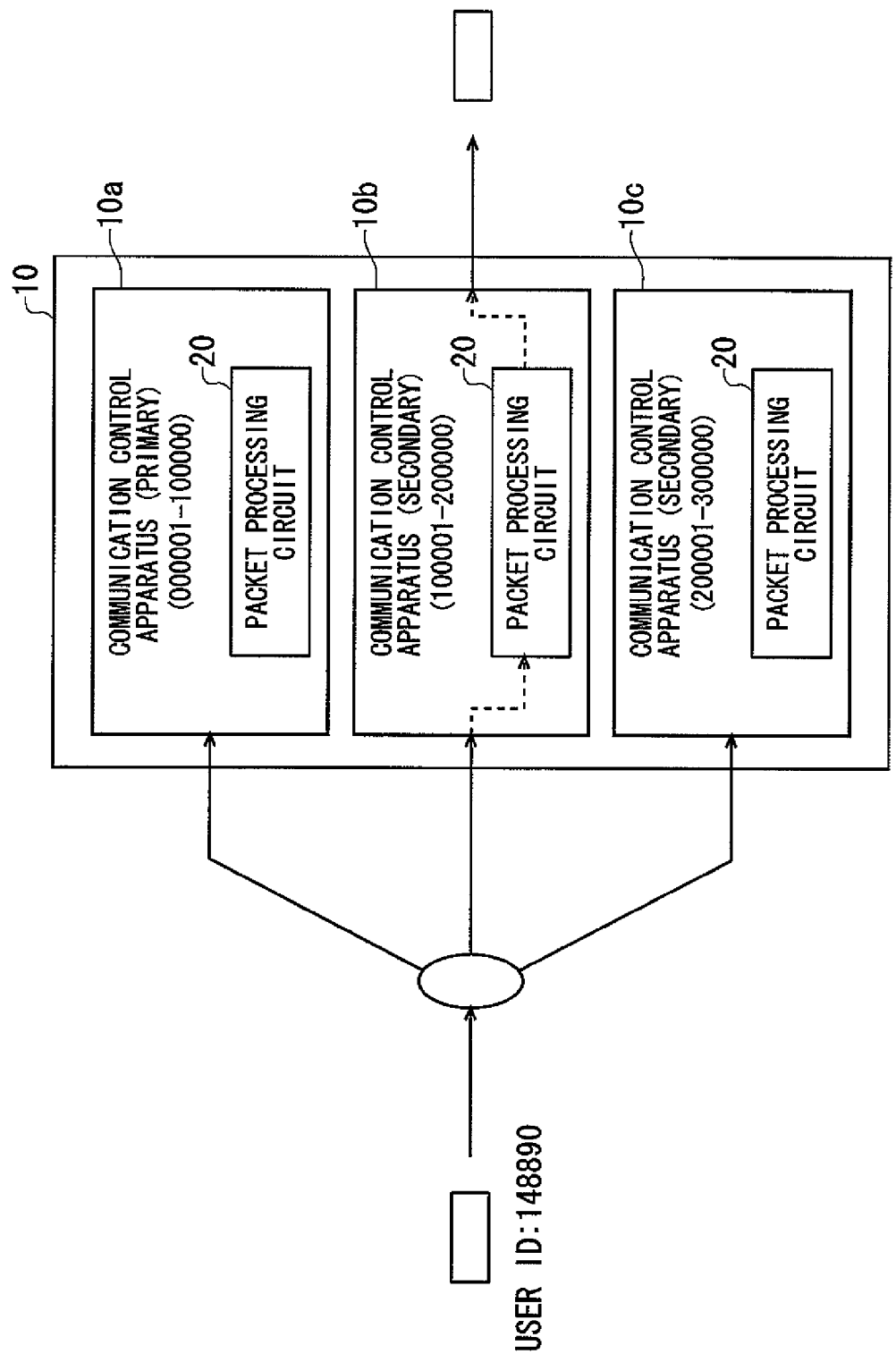
FIG. 24 is a diagram that shows a procedure for processing a packet using one of multiple communication control apparatuses.

FIG. 24 shows a procedure for processing a packet using one of multiple communication control apparatuses. In the example of FIG. 24, the communication control apparatus 10 includes three communication control apparatuses 10a, 10b and 10c, and the user database 57 stores a list of user IDs of "000001-300000"; the communication control apparatus 10a processes packets from users with the user IDs "000001-100000", the communication control apparatus 10b processes packets from users with the user IDs "100001-200000", and the communication control apparatus 10c processes packets from users with the user IDs "200001-300000". The communication control apparatus 10a is specified as the primary apparatus, while the communication control apparatuses 10b and 10c are specified as the secondary apparatuses.

For example, it is assumed that the system receives a packet from a user with the user ID "148890". Since the user ID appears in the list stored in the user database 57, the packet should be processed by one of the communication control apparatuses. In this example, the communication control apparatus 10b, which processes packets from users with the user IDs "100001-200000", processes the packet, while the communication control apparatuses 10a and 10c discard the packet.

Figure 25:
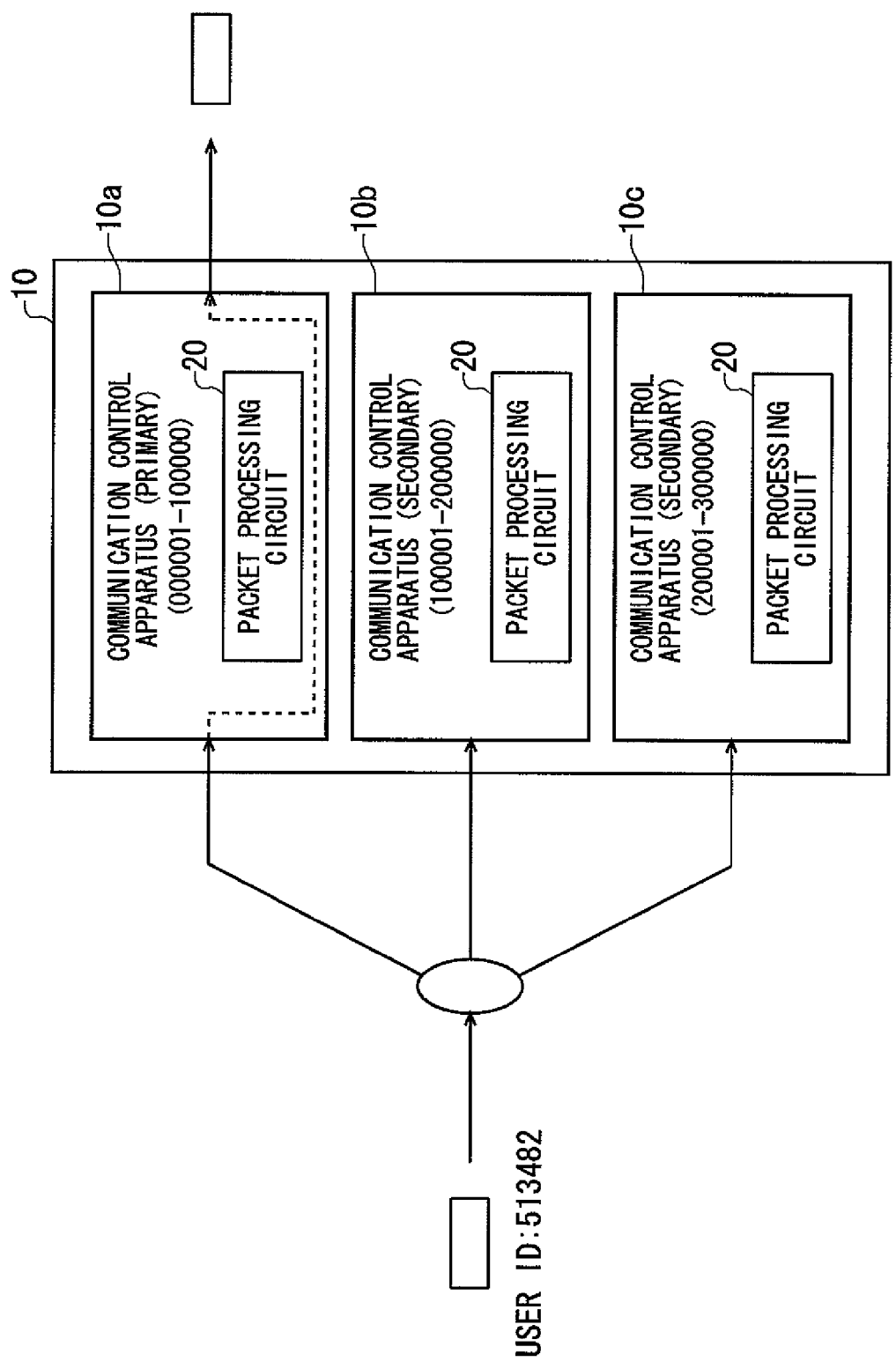
FIG. 25 is a diagram that shows a procedure for making a packet pass through one of the multiple communication control apparatuses.

FIG. 25 is a diagram that shows a procedure for making a packet pass through one of the multiple communication control apparatuses. It is assumed here that the system receives a packet from a user with the user ID "513482" in the same example as shown in FIG. 24. Since the user ID does not appear in the list stored in the user database 57, the packet need not be processed by any of the communication control apparatuses. Accordingly, in order to make the packet pass through without processing it, only the communication control apparatus 10a, which has been specified as the primary apparatus, makes the packet pass through, while the other communication control apparatuses 10b and 10c discard the packet. With such technique, a packet to be processed can be appropriately processed by one communication control apparatus, while a packet not to be processed can be made to pass through as it is.

Since these communication control apparatuses receive all packets sent via parallelcast from the communication path control apparatus 200 to process or discard them, as stated previously, the apparatuses need not be provided with IP addresses, which uniquely identify apparatuses on the Internet. If the packet processing as discussed above is performed by server apparatuses or the likes, it will be necessary to consider attacks to the server apparatuses. However, since the communication control apparatuses of the present embodiment cannot be directly attacked by malicious third parties via the Internet, communication control can be performed securely.

The present invention has been described with reference to the embodiment. The embodiment is intended to be illustrative only and it will be obvious to those skilled in the art that various modifications to constituting elements or processes could be developed and that such modifications also fall within the scope of the present invention.

The embodiment describes a communication control system in which each of multiple communication control apparatuses has a data processing unit and a data retaining unit. However, the technique of the present invention is equally applicable to the case where a single data processing apparatus has multiple data retaining units. The technique is also applicable to the case where a single data processing unit refers to databases stored in multiple data retaining units to process data. With regard to the data retaining units on standby, two or more units may be provided.

INDUSTRIAL APPLICABILITY

The present invention is applicable to a data processing system that includes multiple databases.

What is claimed is:

1. A data processing system, comprising:
   a data processing unit which processes data acquired; and
   a plurality of data retaining units which store databases used to process the data, wherein: each of the plurality of data retaining units stores a primary database in common and stores the respective shares of a secondary database;
   the primary database stores a list of IDs for identifying data to be processed by anyone of the plurality of data processing units;
   each of the data processing units is notified of a range of IDs that the data processing unit should handle among the list of IDs stored in the primary database, and, when acquiring a packet containing an ID that lies within the range of IDs, the data processing unit processes the packet;
   at least one more data retaining unit which can store the primary database and the respective shares of the secondary database; and
   an operation management unit which manages the operating state of the plurality of data retaining units, wherein:
   the operation management unit operates as many as the number of data retaining units required to share and store the secondary database, and places the other data retaining unit on standby; and,
   when a database retained in the data retaining units is updated, the operation management unit stores, in a data retaining unit on standby, updated data of the database retained in anyone of the data retaining units in operation, and subsequently stops the operation of the data retaining unit storing the database before update and places the data retaining unit storing the updated database in operation.

2. The data processing system of claim 1, wherein, when detecting a data retaining unit in operation being inoperable, the operation management unit stores the database retained by the data retaining unit in a data retaining unit on standby, and places the data retaining unit on standby in operation.

3. The data processing system of claim 2, wherein the data retaining unit on standby stores the primary database in advance.

4. The data processing system of claim 2, wherein:
   a plurality of the data processing units are provided so as to correspond to the plurality of data retaining units respectively; and
   the data processing system further comprises a data supply unit which provides acquired data to the plurality of data processing units in parallel.

5. The data processing system of claim 1, wherein the data retaining unit on standby stores the primary database in advance.

6. The data processing system of claim 5, wherein:
   a plurality of the data processing units are provided so as to correspond to the plurality of data retaining units respectively; and the data processing system further comprises a data supply unit which provides acquired data to the plurality of data processing units in parallel.

7. The data processing system of claim 1, wherein:
   a plurality of the data processing units are provided so as to correspond to the plurality of data retaining units respectively; and
   the data processing system further comprises a data supply unit which provides acquired data to the plurality of data processing units in parallel.

8. The data processing system of claim 7, wherein the data supply unit provides acquired data as it is to the plurality of data processing units in parallel without processing the data.

9. The data processing system of claim 8, wherein, upon acquisition of data from the data supply unit, each of the plurality of data processing units refers to the primary database retained in the corresponding data retaining unit so as to determine whether or not to process the data.

10. The data processing system of claim 7, wherein, upon acquisition of data from the data supply unit, each of the plurality of data processing units refers to the primary database retained in the corresponding data retaining unit so as to determine whether or not to process the data.

11. The data processing system of claim 10, wherein the data processing units are communication control apparatuses which acquire packets to control communications, and, upon acquisition of a packet from the data supply unit, each of the data processing units acquires the packet without determining whether the packet is directed to the data processing unit itself, and refers to a database retained in the corresponding data retaining unit so as to determine whether or not to process the packet.

12. The data processing system of claim 11, wherein each of the communication control apparatuses uses information stored in the data portion of the packet instead of information stored in the header portion thereof to determine whether or not to process the packet.

13. The data processing system of claim 12, wherein each of the communication control apparatuses refers to the primary database retained in the corresponding data retaining unit so as to determine whether or not to process the packet.

14. The data processing system of claim 11, wherein each of the communication control apparatuses refers to the primary database retained in the corresponding data retaining unit so as to determine whether or not to process the packet.

15. The data processing system of claim 11, wherein a data processing unit that has determined to process the packet processes the packet, while a data processing unit that has determined not to process the packet discards the packet.

16. The data processing system of claim 11, wherein the data supply unit provides to the plurality of communication control apparatuses in parallel an acquired packet as a unicast packet without converting the packet to a broadcast packet.

17. The data processing system of claim 1, wherein, when acquiring a packet that does not contain any of the IDs included in the list of IDs stored in the primary database, at least one of the plurality of data processing units makes the packet pass through without processing it.

* * * * *